(12) United States Patent
Hamada et al.

(10) Patent No.: US 6,333,916 B1
(45) Date of Patent: Dec. 25, 2001

(54) WIRELESS COMMUNICATION SYSTEM, APPARATUS, AND METHOD TO COMMUNICATE USING A PLURALITY OF COMMUNICATION SLOTS IN TIME DIVISION MULTIPLE ACCESS TECHNIQUE

(75) Inventors: Masashi Hamada, Tokyo; Mitsuhiro Watanabe, Ebina, both of (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/118,955

(22) Filed: Jul. 17, 1998

(30) Foreign Application Priority Data

Jul. 28, 1997 (JP) .................................... 9-201440

(51) Int. Cl.[7] .................................... H04B 7/00
(52) U.S. Cl. .................... 370/225; 370/330; 370/337; 370/442
(58) Field of Search ................... 370/216, 225, 370/228, 252, 337, 345, 340, 347, 442, 458, 329, 330, 341

(56) References Cited

U.S. PATENT DOCUMENTS

| | | | |
|---|---|---|---|
| 5,844,894 | * 12/1998 | Dent | 370/330 |
| 5,862,130 | * 1/1999 | Tat et al. | 370/330 |
| 5,937,002 | * 8/1999 | Andersson et al. | 375/202 |
| 8,570,391 | * 2/1999 | Nago | 370/330 |

* cited by examiner

Primary Examiner—Ricky Ngo
(74) Attorney, Agent, or Firm—Morgan& Finnegan, LLP

(57) ABSTRACT

Communication between a wireless communication apparatus and a receiver using a plurality of communication slots is realized. Further, if trouble occurs during performing time-division wireless communication between the wireless communication apparatus and the receiver using the plurality of communication slots, the communication is continued while maintaining the same or similar communications traffic rate. A series of data is assigned to a plurality of communication slots in a first communication carrier, and communication is performed through the plurality of communication slots. If trouble occurs in a communication slot out of the plurality of communication slots, the communication is continued after changing the troubled communication slot to a communication slot of another communication carrier or another communication slot.

48 Claims, 20 Drawing Sheets

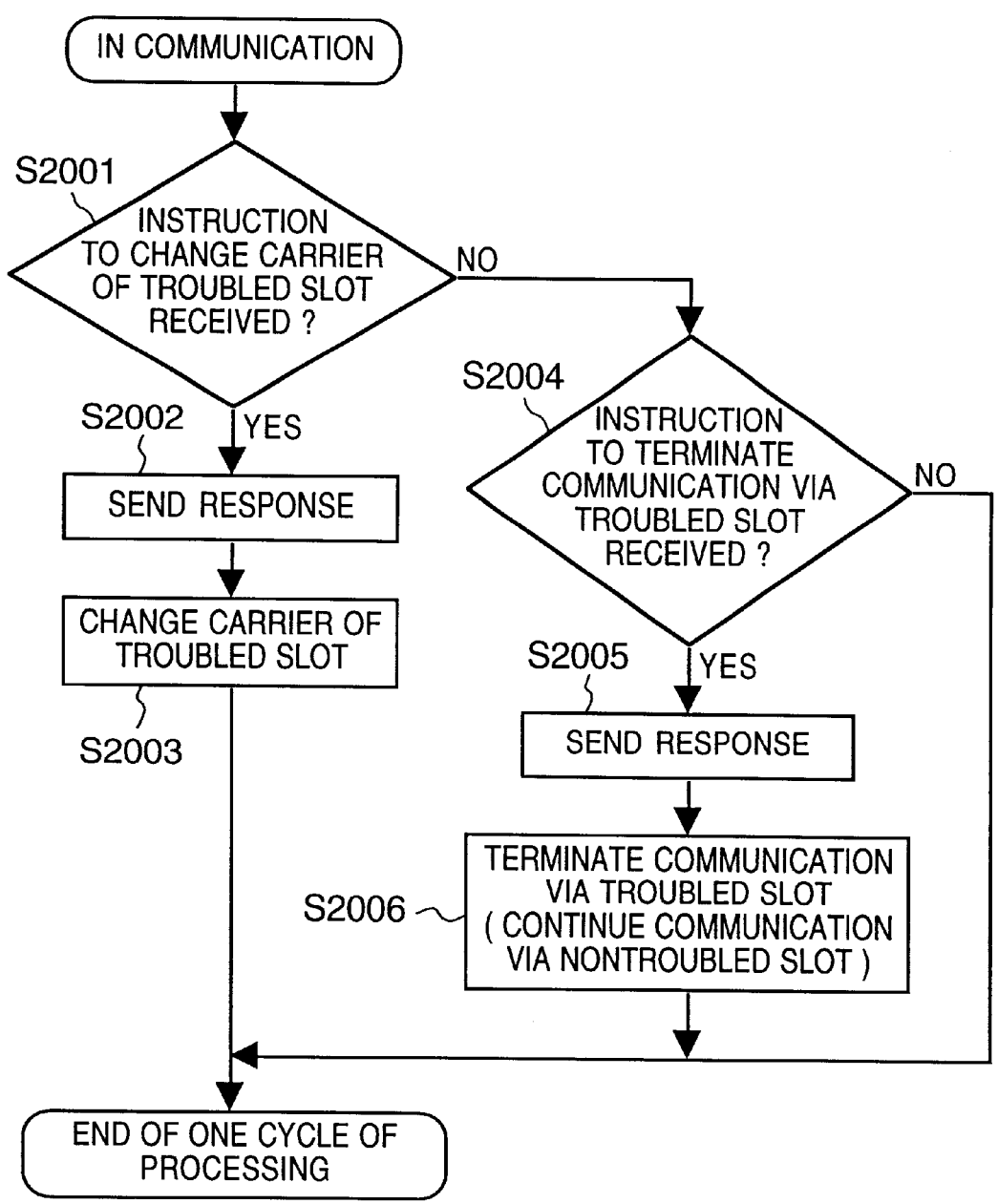

WIRELESS COMMUNICATION SYSTEM, APPARATUS, AND METHOD TO COMMUNICATE USING A PLURALITY OF COMMUNICATION SLOTS IN TIME DIVISION MULTIPLE ACCESS TECHNIQUE

BACKGROUND OF THE INVENTION

The present invention relates to a wireless communication system, apparatus, and method to communicate using a plurality of communication slots in time division multiple access technique.

In conventional time division multiple access communication in a wired network using an ISDN network, a communication apparatus can perform communication using two communication slots (e.g., B1 and B2 channels).

However, in time division multiple access communication using radio channels, such as a personal handyphone system (PHS) and a personal digital cellular (PDC), when a communication apparatus communicates with another communication apparatus, the communication is performed using only one of a plurality of communication slots of a communication frame. Communication using two or more communication slots has not been performed.

Thus, in the conventional wireless time division multiple access communication, communication is performed using only one communication slot; accordingly, communications traffic between two radio communication apparatuses is limited to the channel capacitance of one communication slot (e.g., 32 kbps in PHS). Therefore, the conventional radio communication apparatus is not suitable for transmitting non-audio data, for instance, which is more frequently transmitted than before.

Further, if communication using two or more communication slots in time division multiple access technique via radio channels is tried, difficulties occur, since wireless communication is easily interfered by, e.g., other wireless communication and electromagnetic wave generated by electrical appliance, compared to wired communication. Therefore, when wireless communication is performed using, e.g., two communication slots, either or both of the channels would be interfered frequently, which may interrupt the communication.

SUMMARY OF THE INVENTION

The present invention has been made in consideration of the above situation, and has as its object to keep the same or similar communications traffic via a plurality of communication slots even after troubles occur and one or more of the communication slots become useless while communicating between radio communication apparatuses.

It is another object of the present invention to prevent a drop of communications traffic or keep a drop of communications traffic as low as possible, at least, when a radio channel of a communication slot is deteriorated.

Further, it is another object of the present invention to maintain a current wireless link and provide information for executing an application suitable for the status of a channel by informing the application of the status of communications traffic due to a decrease in the number of available communication slots when a decrease of communications traffic can not be avoid.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 20 is a flowchart showing switching processing of communication slots by a controller of a radio communication terminal (PS) according to the third embodiment of the present invention.

DETAILED DESCRIPTION OF THE PREFERRED EMBODIMENTS

Preferred embodiments of the present invention will be described in detail in accordance with the accompanying drawings.

<First Embodiment>

In the first embodiment, a wireless data communication using two communication slots of a single carrier (frequency) by a personal handyphone system (PHS), which is one type of digital codeless telephones in Japan, as a wireless communication medium capable of performing multiple access-duplex (TDMA-TDD) communication, a wireless communication using a plurality of communication slots assigned in a plurality of carriers, is explained.

During the communication, when either or both of the two communication slots are interfered by, e.g., other wireless communication and electromagnetic wave generated by electrical appliances, the carrier of the interfered slots is changed to another carrier to continue the communication.

Figure 1:
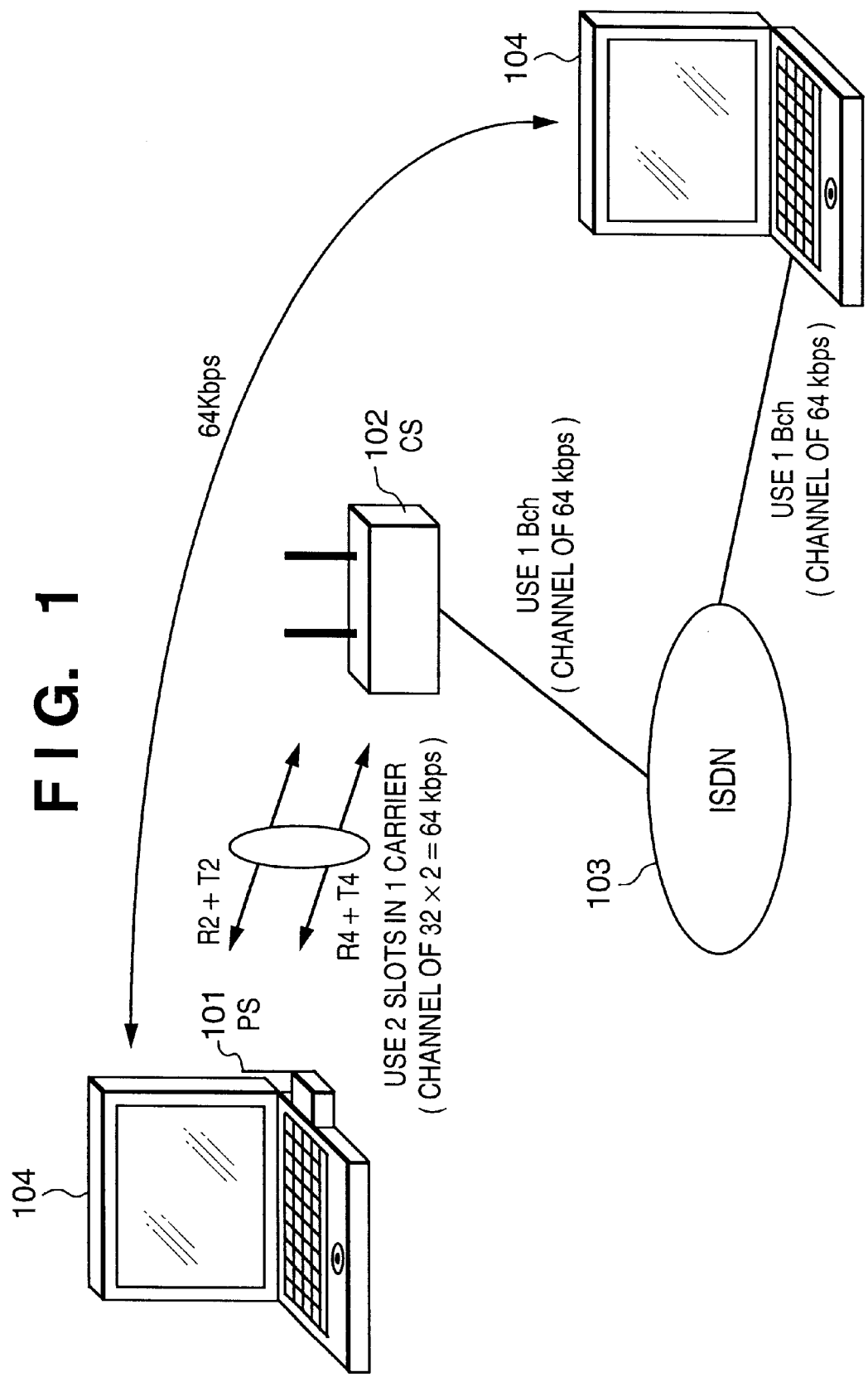
FIG. 1 shows a configuration of a system according to a first embodiment of the present invention.

FIG. 1 shows a system configuration according to the first embodiment.

In FIG. 1, reference numeral 101 denotes a radio communication terminal (PS), using a PHS as a wireless communication device, capable of connecting to a data processing apparatus, such as a personal computer; 102, a radio base station (CS) for connecting, by wireless means, to the terminal 101; 103, an Integrated Services Digital Network (ISDN) including the base station 102; and 104, personal computers (PC), capable of connecting to the terminal 101, on which an application is executed.

In the first embodiment, the terminal 101 is connected to the PC 104, and data from the PC 104 is transmitted using a radio communication function of the terminal 101.

Figure 2:
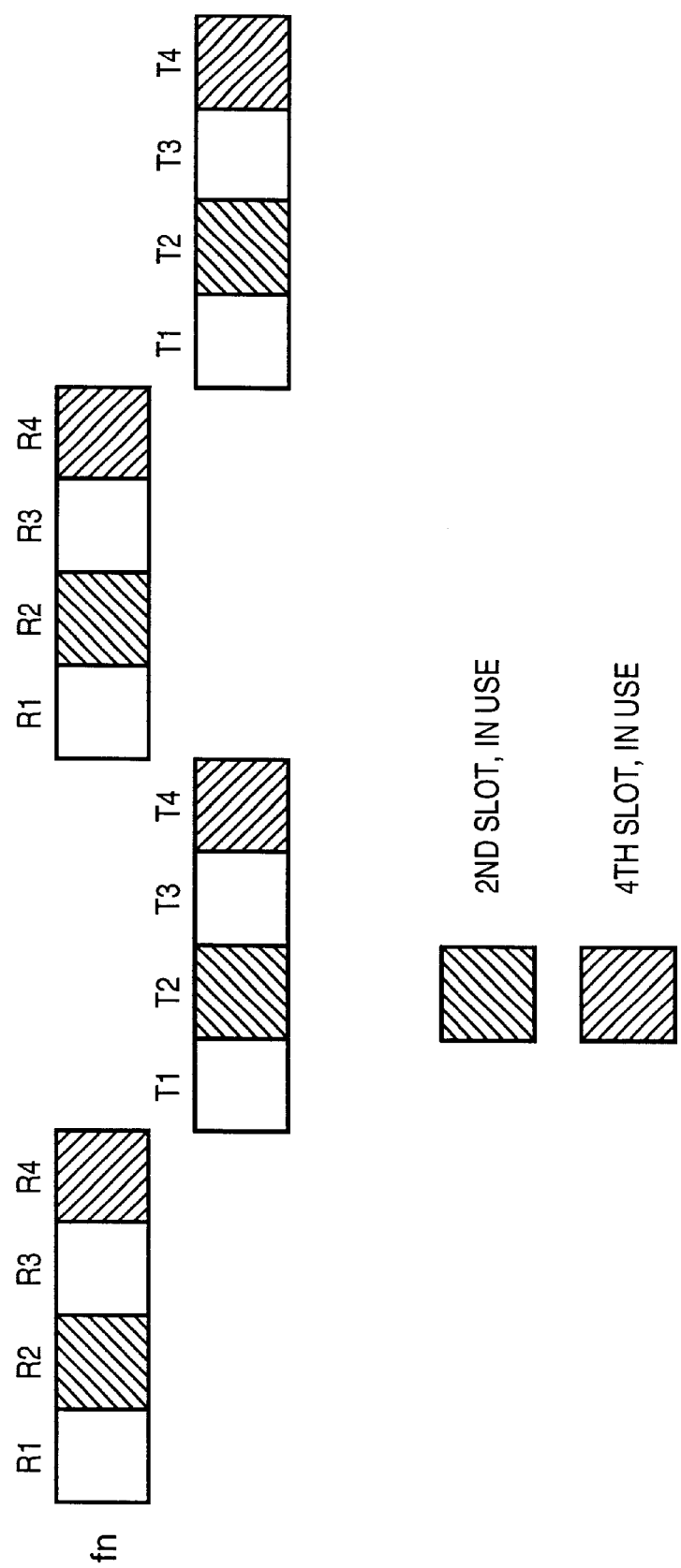
FIG. 2 is a conceptual view showing utilization of communication slots of a PHS data communication system according to the first embodiment of the present invention.

FIG. 2 is a conceptual view showing utilization of communication slots of a PHS data communication system according to the first embodiment.

As shown in FIG. 2, a communication frame in the PHS is configured by four communication slots, and one of a plurality of carriers is used in each communication frame.

Further, in FIG. 2, references R1 to R4 collectively denote a reception frame, and references T1 to T4 collectively denote a transmission frame.

In the first embodiment, a radio communication terminal uses two out of the four communication slots to perform communication as shown in FIG. 2 (in FIG. 2, the second communication slots (T2, R2) and the fourth communication slots (T4, R4)).

Figure 3:
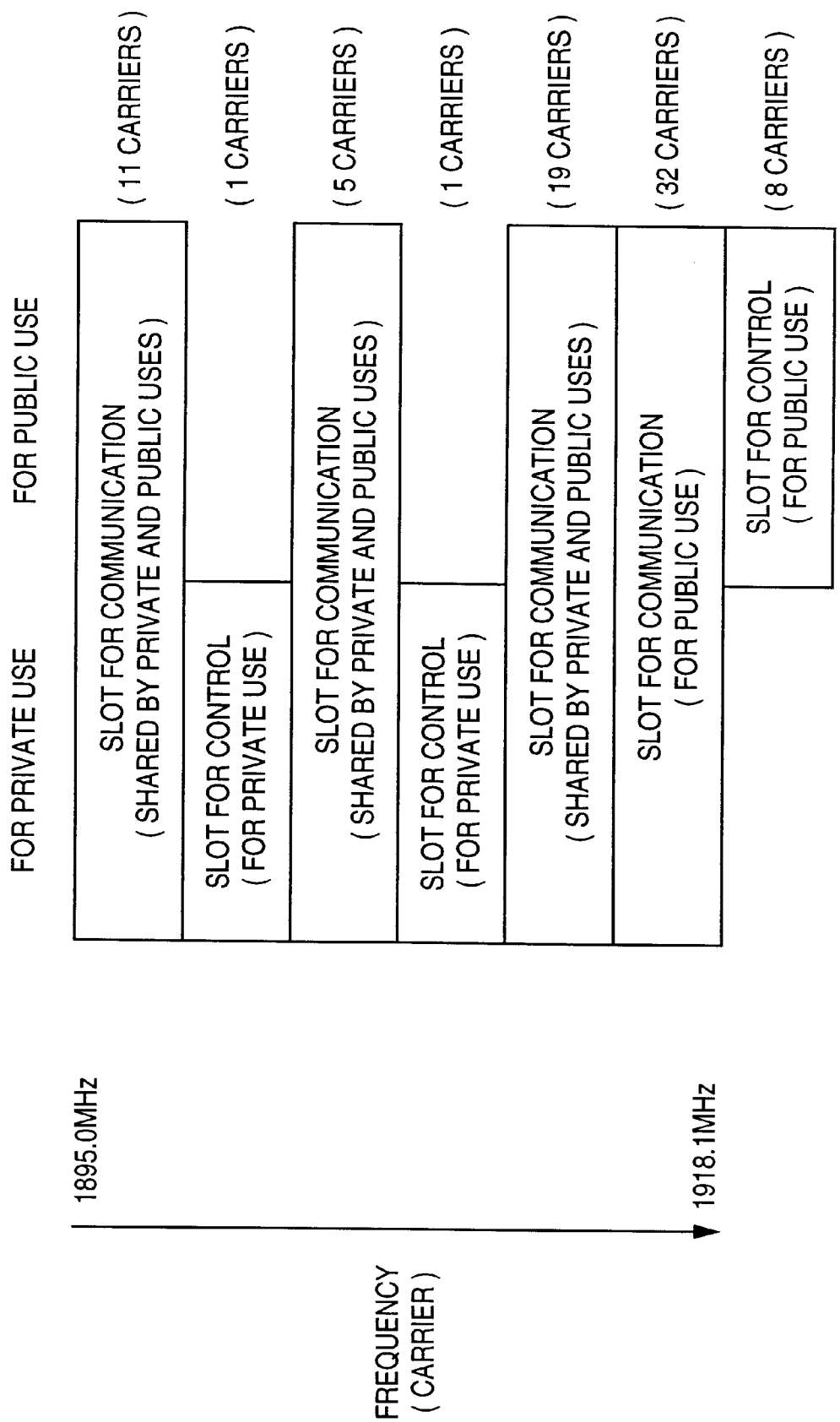
FIG. 3 shows a mapping of physical slots of carriers in PHS.

FIG. 3 shows a mapping of physical slots of carriers in the PHS.

Figure 4:
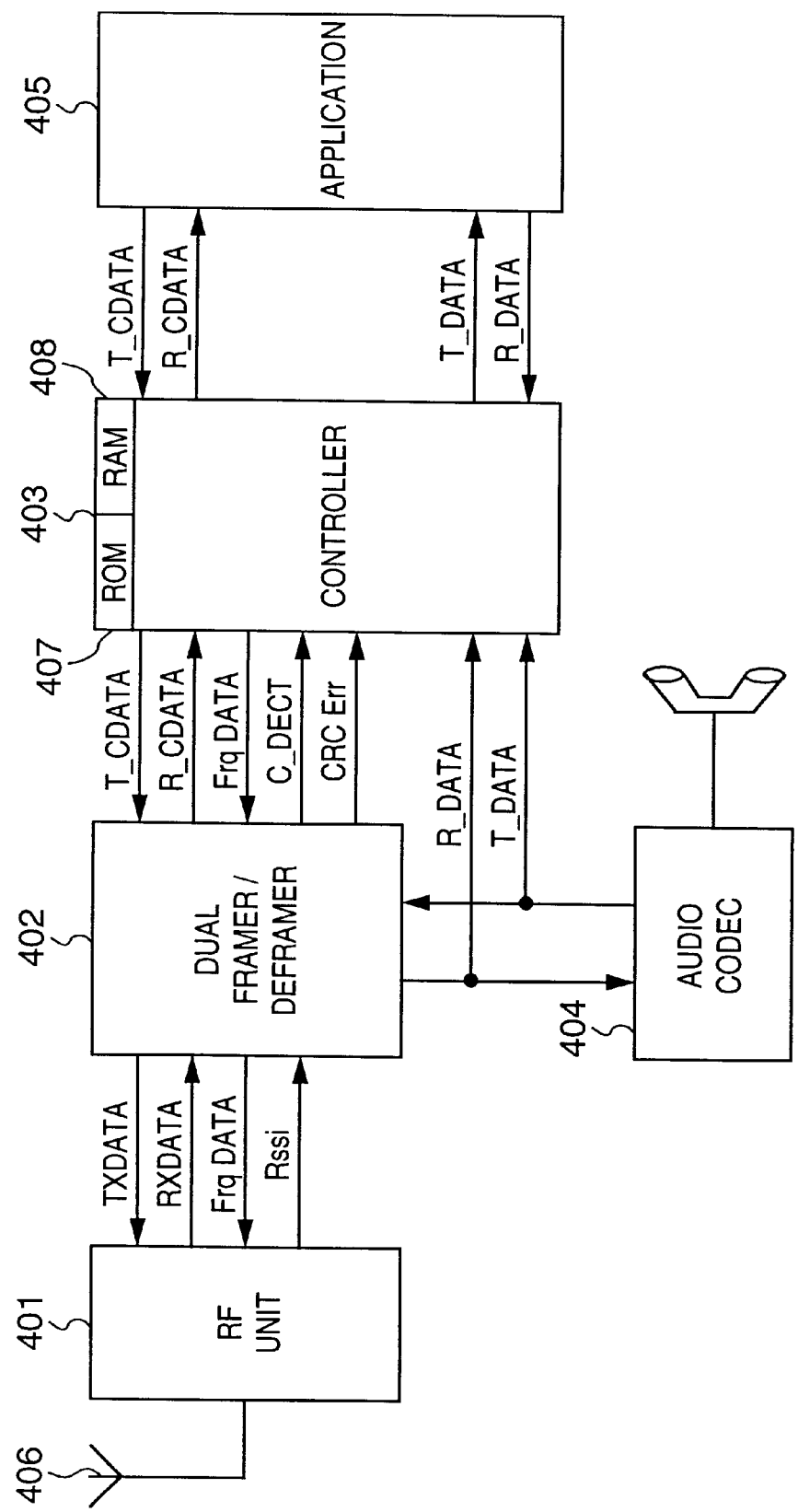
FIG. 4 is a block diagram illustrating a configuration of a radio communication terminal (PS) according to the first embodiment of the present invention.

FIG. 4 is a block diagram illustrating a configuration of the terminal (PS) 101.

In FIG. 4, reference numeral 401 denotes a radio frequency (RF) unit, and reference numeral 402 denotes a dual framer/deframer. The dual framer/deframer 402 divides data of 64 kbps inputted from an application into data of 32 kbps, stores the data of 32 kbps in two communication slots each having channel capacitance of 32 kbps, and assembles the four communication slots into a communication frame. Further, the framer/deframer 402 disassembles data of 32 kbps corresponding to two communication slots received by the RF unit 401, assembles the data of 32 kbps into data of 64 kbps and passes the data to the application. Furthermore, the framer/deframer 402 intercedes with the RF unit 401 for setting frequency data, and determines whether or not there is a carrier, on the basis of the intensity of received electric field (Rssi) inputted from the RF unit 401. In addition, the framer/deframer 402 can perform data check (CRC check) on a received frame. Reference numeral 403 denotes a controller for administering a communication protocol and other operations on the basis of a program stored in ROM 407. Further, in the controller 403, there are the ROM 407 which stores a program for the controls and RAM 408 which serves as a work area.

Reference numeral 404 denotes an audio codec used in audio communication; 405, a communication application executed by the PC 104 shown in FIG. 1; and 406, an antenna.

Figure 5:
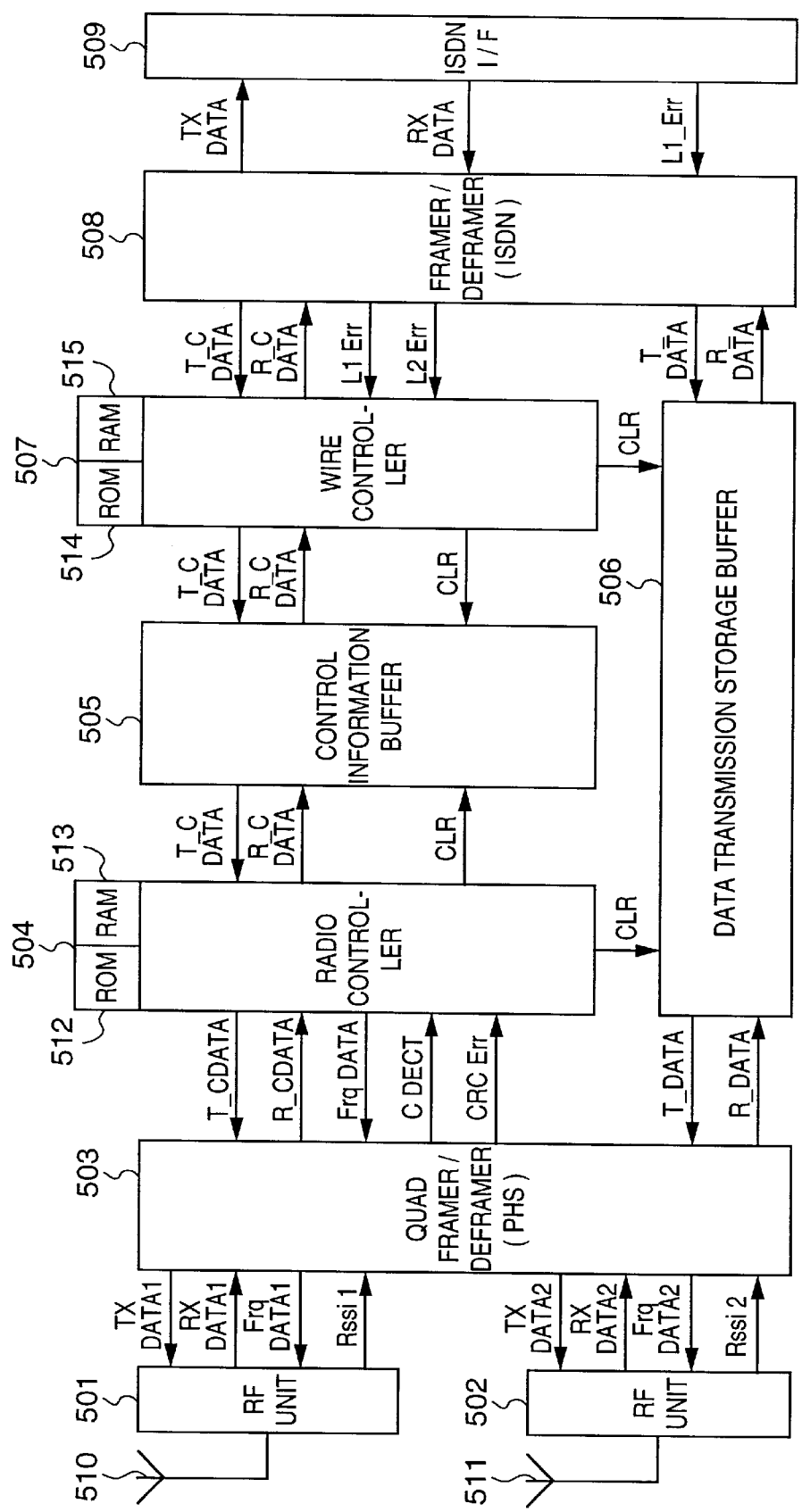
FIG. 5 is a block diagram illustrating a configuration of a radio base station (CS) according to the first embodiment of the present invention.

FIG. 5 is a block diagram illustrating a configuration of a radio base station (CS) 102.

In FIG. 5, reference numerals 501 and 502 denote RF units, and reference numeral 503 denotes a quad framer/deframer. The framer/deframer 503 stores the data of 64 kbps in two communication slots, used by a radio communication terminal, out of a communication frame configured by four communication slots each having channel capacitance of 32 kbps, and assembles thee four communication slots into a communication frame. Further, the framer/deframer 503 disassembles data, corresponding to two communication slots of 32 kbps, received by the RF units 501 and 502, and assembles the data of 32 kbps into data of 64 kbps so as to be passed to the ISDN. Furthermore, the framer/deframer 503 intercedes with the RF units 501 and 502 for setting frequency data, and determines whether or not there is a carrier, on the basis of the intensities of received electric fields (Rssi) inputted from the RF units 501 and 502. In addition, the framer/deframer 503 can perform data check (CRC check) on a received frame. Reference numeral 504 denotes a radio controller for administering radio communication protocol and various kinds of radio controls on the basis of a program stored in ROM 512. The radio controller 504 includes the ROM 512 which stores the program for the controls and RAM 513 which serves as a work area.

Reference numeral 505 denotes a control information buffer for controlling transmission and reception between the radio controller 504 and a wire controller 507; 506, a data transmission storage buffer which interfaces between the quad framer/deframer 503 and a framer/deframer 508 for transmission of data (e.g., audio digital data or unlimited digital data); and 507, the wire controller for administering a wire communication protocol and various kinds of wire communication controls on the basis of a program stored in ROM 514. The wire controller 507 includes the ROM 514 which stores the program for the controls and RAM 515 which serves as a work area.

Reference numeral 508 denotes the framer/deframer for performing transference of frame configuration, transmitted data, and control data for performing PHS communication and ISDN communication; and 509, an ISDN interface (I/F) which is a communication interface to an ISDN line.

Since PHS is used in the wireless communication of the first embodiment, two communication slots, each having the channel capacity of 32 kbps, are used to communicate at a rate of 64 kbps. The data transmitted via the two communication slots is transmitted through a channel Bch (64 kbps) of the ISDN.

In order to realize the above communication, a dual (i.e., two-channel) framer/deframer 402 is provided to the terminal (PS) 401, and communication is performed using the single RF unit 401 via a pair of communication slots (e.g., a pair of the first and second communication slots or a pair of the second and fourth communication slots), where one of the two communication slots is used as a guard slot.

Note, in FIGS. 1 and 2, communication is performed using the second and fourth communication slots.

Further, the base station (CS) 102 has the quad (i.e., four-channel) framer/deframer 503, and communication is performed using one of the RF units 501 and 502 via a pair of two communication slots (e.g., a pair of the first and second communication slots or a pair of the second and fourth communication slots) where one of the two communication slots is used as a guard slot. In the meantime, the other RF unit scans whether a pair of two communication slots, of another carrier, which is not used in the current communication (i.e., the second and fourth communication slots if the first and third communication slots are currently used in the communication, or the first and third communication slots if the second and fourth communication slots are currently used in the communication) is available.

In the first embodiment, when trouble is detected in either of the two communication slots used in the communication (i.e., an error is detected in the CRC check), the carrier is changed to the other available carrier, which is scanned by the RF unit, so as to maintain proper communication.

Figure 6:
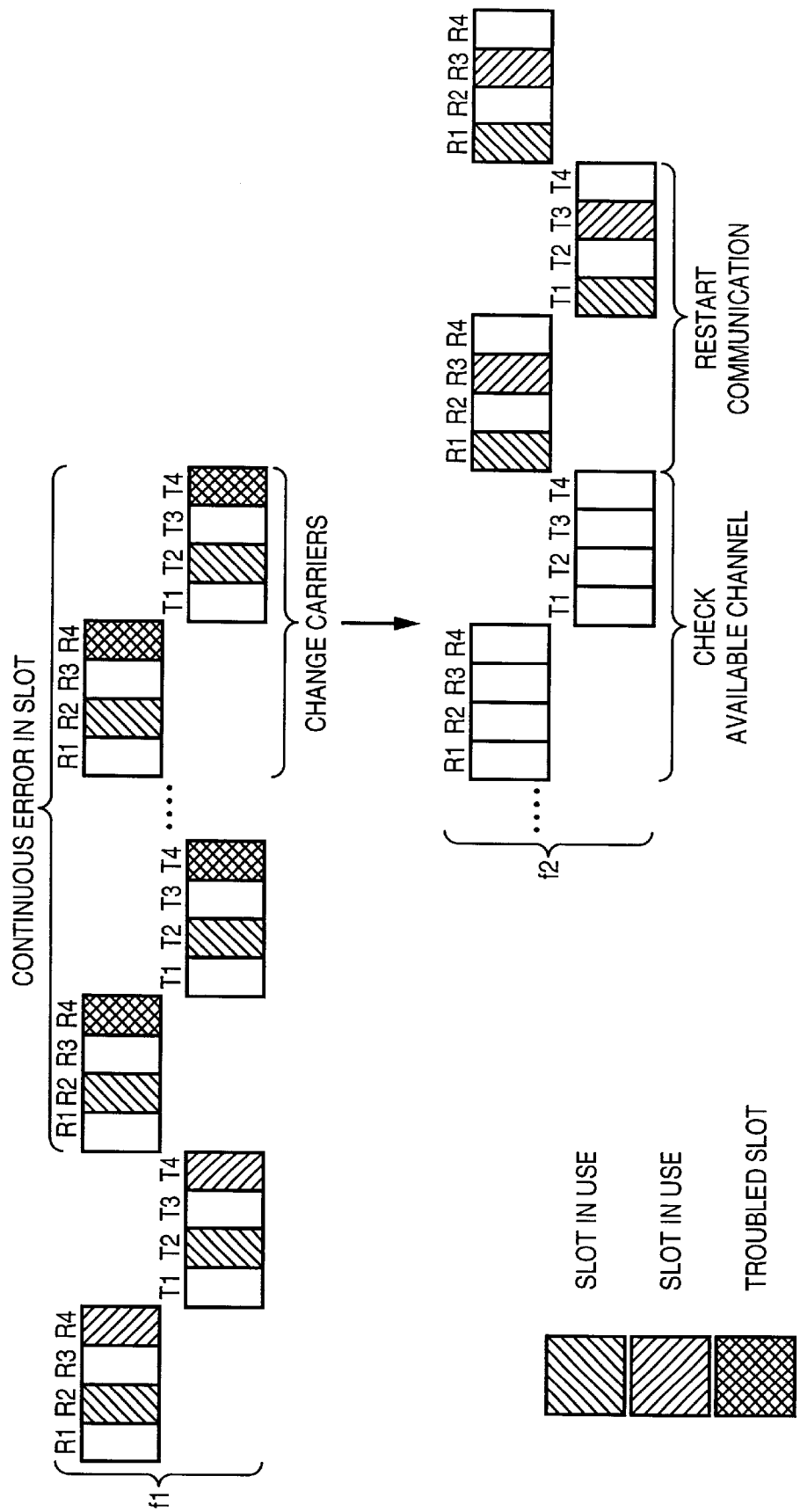
FIG. 6 is a conceptual view showing switching operation of communication carriers when trouble occurs during communication according to the first embodiment of the present invention.

FIG. 6 is a conceptual view showing a communication carrier switching operation performed when trouble occurs during communication.

FIG. 6, f1 denotes a carrier to be changed, and f2 denotes a carrier to be changed to.

While communicating by using two communication slots (second and fourth communication slots in FIG. 6) in the carrier f1, when more than a predetermined number of errors occur in one of the communication slots (in the first embodiment, trouble occurs in the fourth communication slot known by CRC check), the carrier of the slots which are used for communication is changed to the carrier f2 which is checked as available (a carrier having two available communication slots, including a guard slot). Thereafter, the communication is restarted via two communication slots (in FIG. 6, the first and third communication slots) in the carrier f2.

Figure 7:
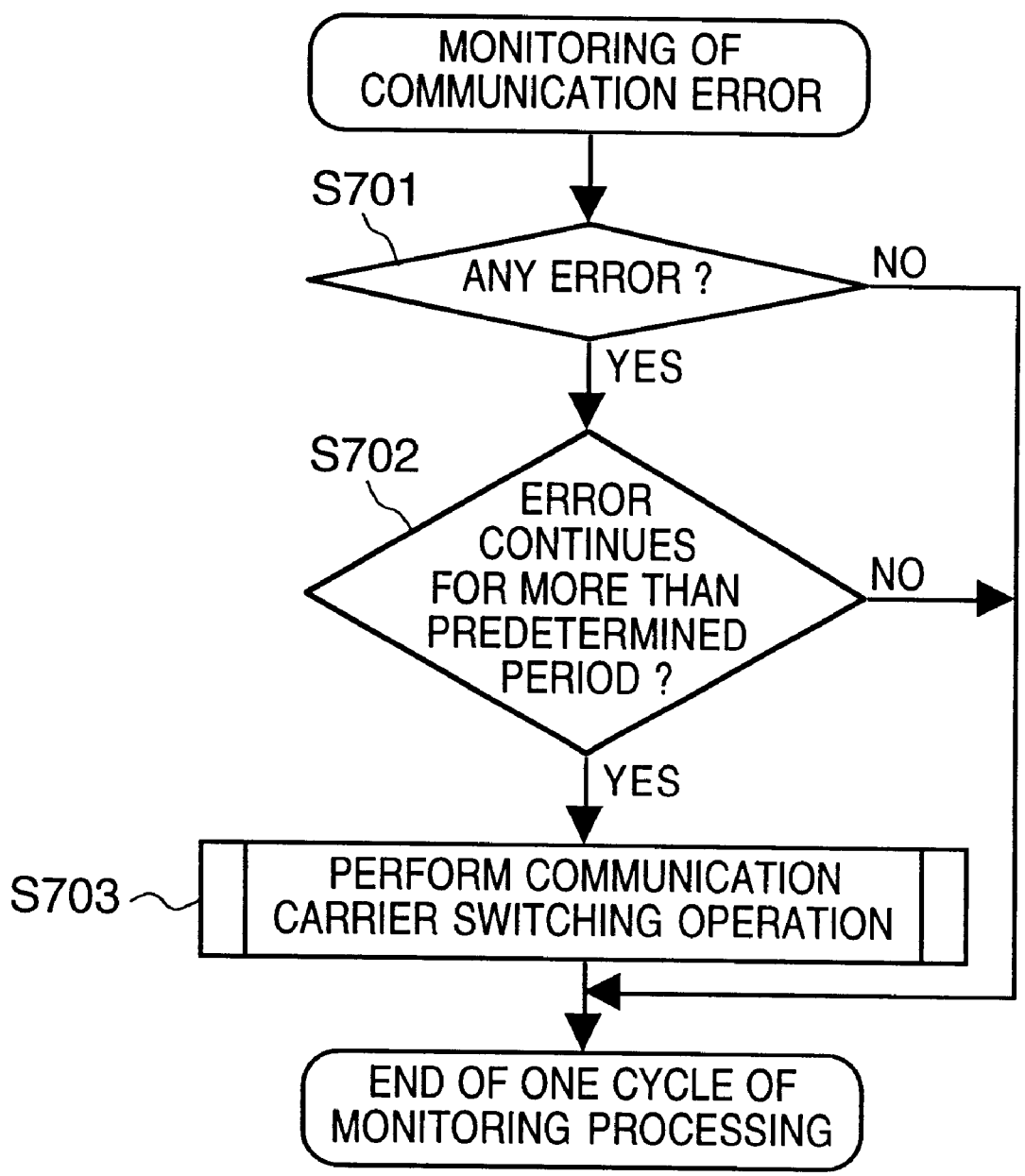
FIG. 7 is a flowchart showing an operation sequence of a radio controller of a radio base station (CS) according to the first embodiment of the present invention.
Figure 8:
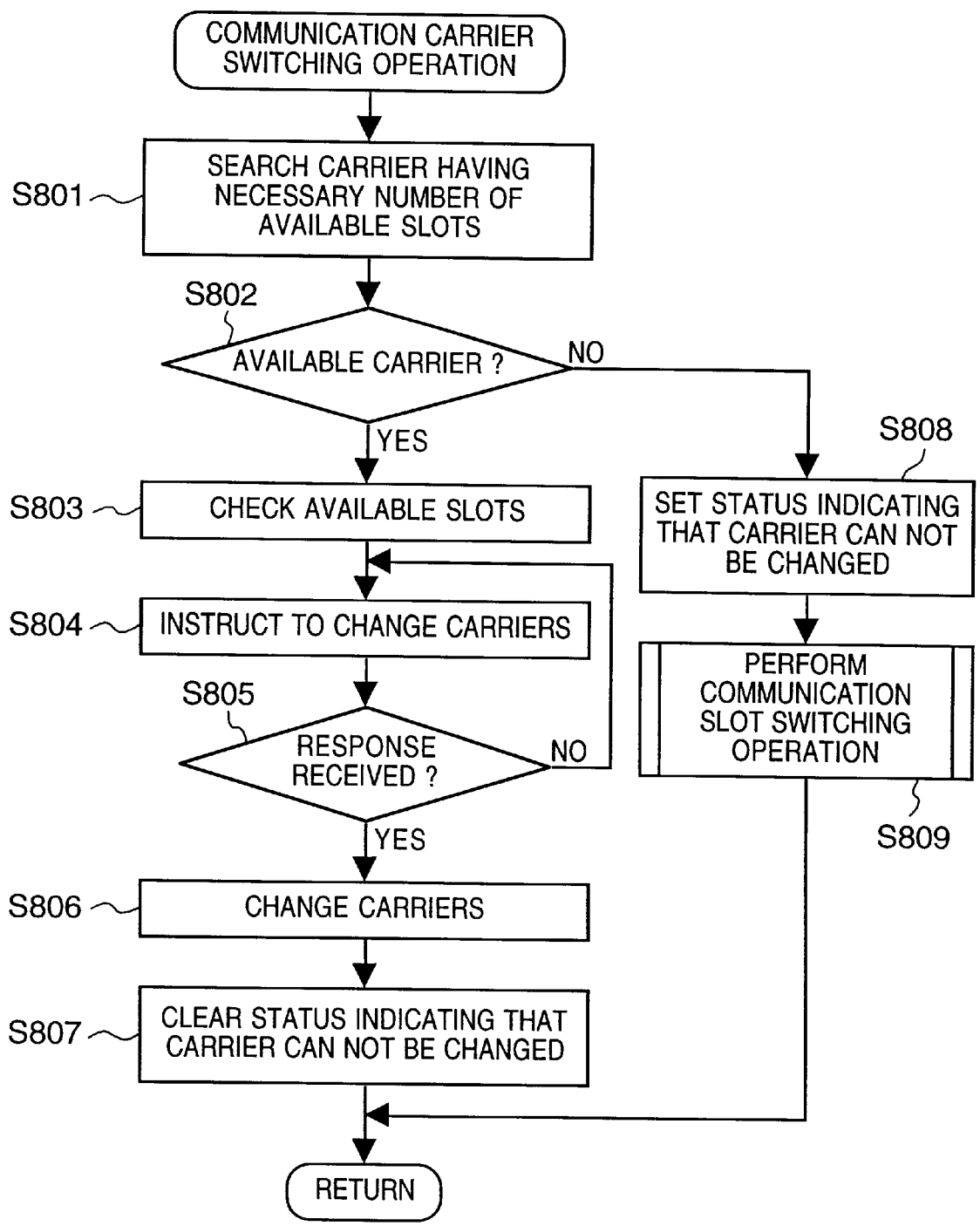
FIG. 8 is a flowchart showing an operation sequence of the radio controller of the radio base station (CS) according to the first embodiment of the present invention.
Figure 9:
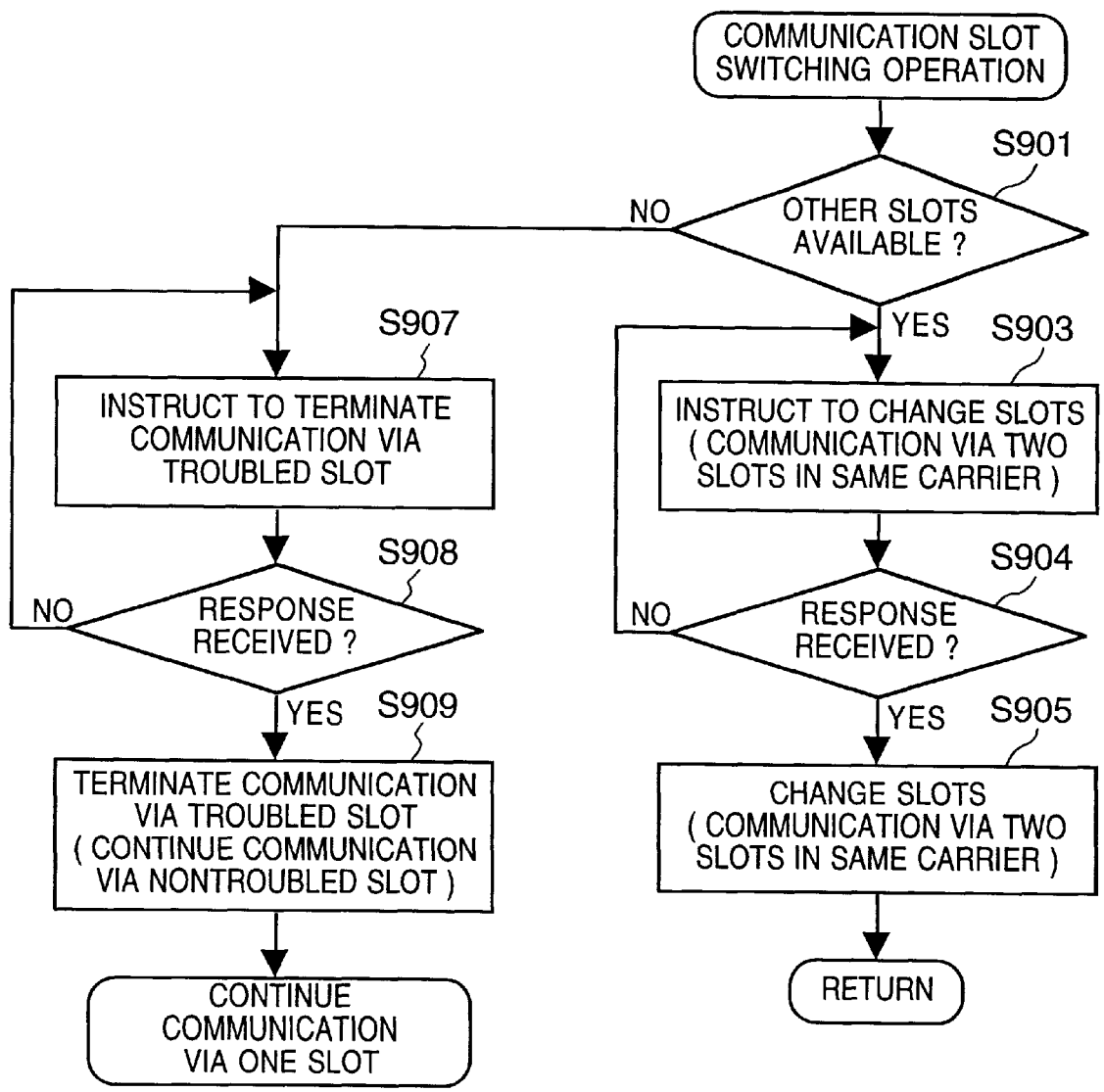
FIG. 9 is a flowchart showing an operation sequence of the radio controller of the radio base station (CS) according to the first embodiment of the present invention.
Figure 10:
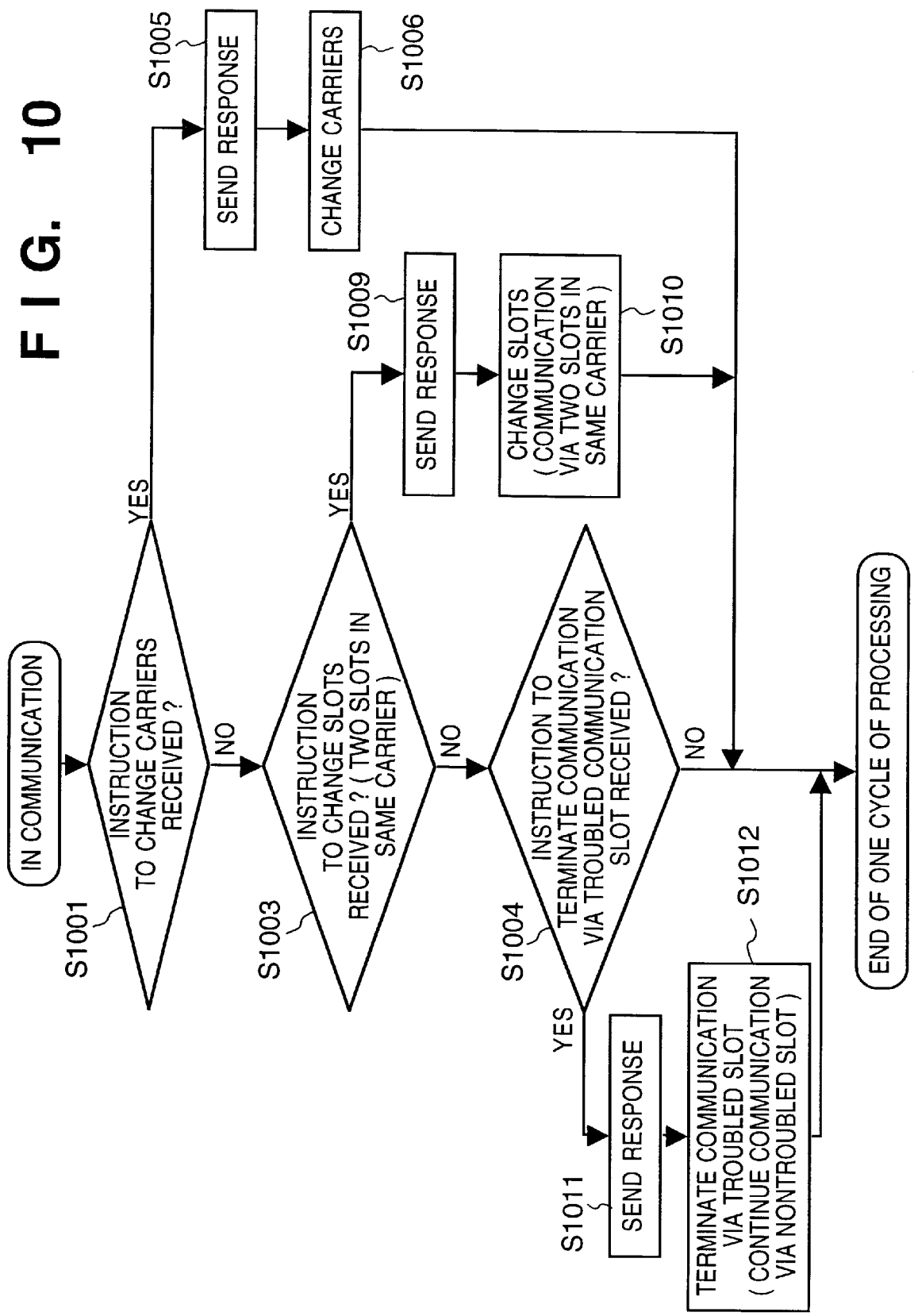
FIG. 10 is a flowchart showing an operation sequence of a controller of a radio communication terminal (PS) according to the first embodiment of the present invention.

FIGS. 7 to 9 are flowcharts showing operations of the radio controller 504 of the base station (CS) 102 for realizing the function of the first embodiment, and FIG. 10 is a flowchart showing operations of the controller 403 of the terminal (PS) 101.

Figure 11:
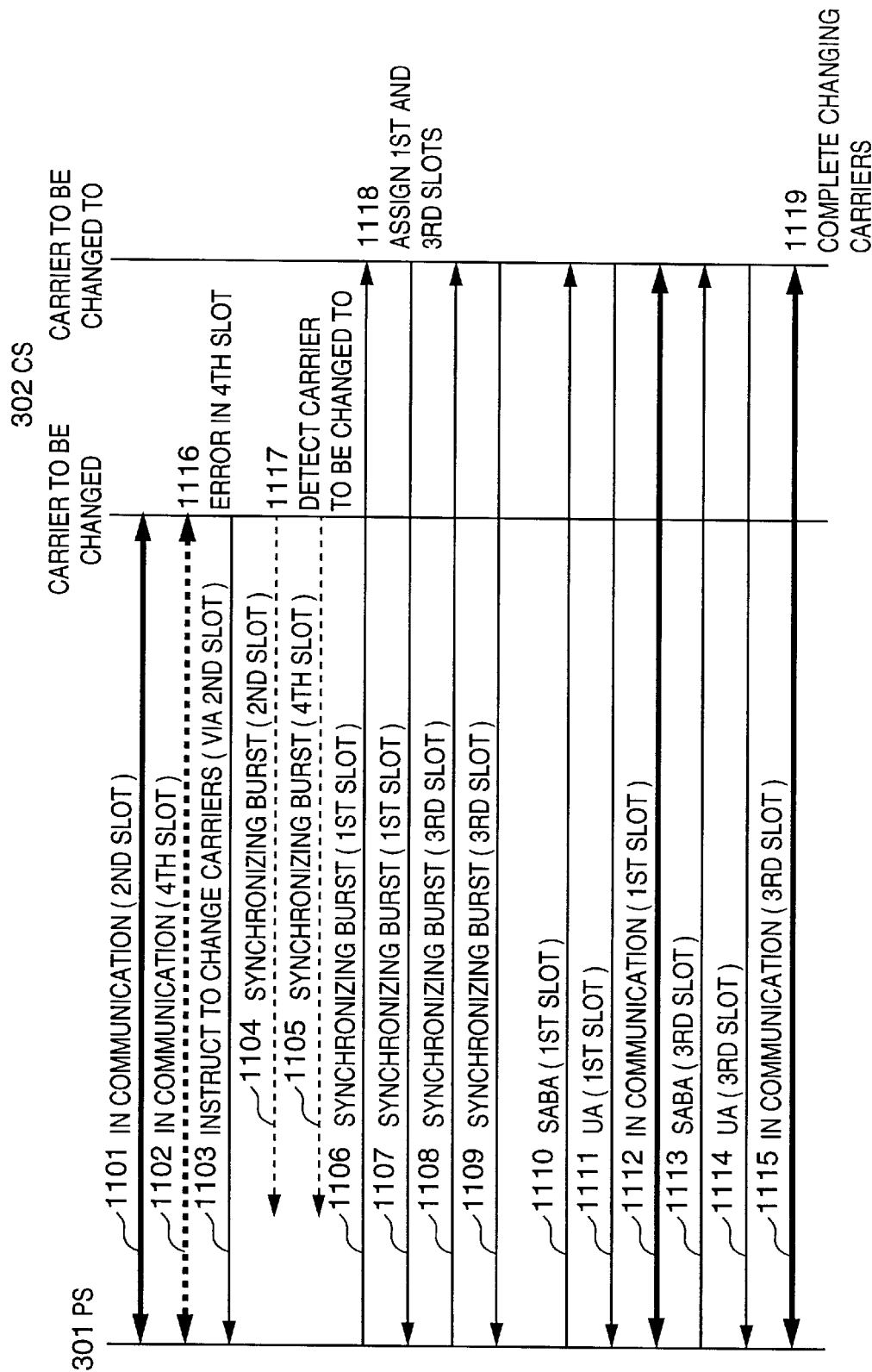
FIG. 11 is a sequential chart showing switching of communication carriers according to the first embodiment of the present invention.

Further, FIG. 11 shows a sequence of the switching of communication carriers.

The sequence shown in FIG. 11 illustrates an example in which, when an error is detected in the fourth communication slot during performing of communication at a rate of 64 kbps using the second and fourth communication slots of a carrier and necessity for the switching of carriers is determined, communication restarts at a rate of 64 kbps using the first and third communication slots after the carrier is changed to another carrier.

The base station (CS) 102 checks an error in the communication (CRC check), shown in FIG. 7, during performing the communication.

Here, it is assumed that trouble occurred in the fourth communication slot when performing communication via the second fourth communication slots.

Referring to FIG. 7, in a case where no error occurs in the communication slots which are in use in the communication (NO in step S701) or in a case where an error is detected (YES in step S701) but the error does not continue for more than a predetermined period (NO in step S702), then one cycle of monitoring processing is completed. Whereas, in a case where the error in a communication slot is detected (YES in step S701) (assumed that an error occurred in the fourth communication slot in the first embodiment) and the error continues for more than a predetermined period (YES in step S702), then the communication carrier switching operation is performed in step S703 (details are in FIG. 8), and one cycle of monitoring processing is completed.

The communication carrier switching operation shown in FIG. 8 is to cope with a case where communication can be continued via at least one of a plurality of communication slots, currently secured for the communication, in a single carrier, but trouble occurs in one or more of the communication slots, which makes the slots useless in the communication, followed by a decrease in the communications traffic and a drop of performance of the communication application, since the number of available slots is decreased.

After the communication carrier switching operation (FIG. 8) starts, first, a carrier having at least the same number of available communication slots as that of communication slots which are currently used in communication (two communication slots of the first embodiment) is searched for using the RF unit (502) which is not currently used in the communication in step S801, and whether or not there is an available carrier satisfying the above condition (i.e., having two available communication slots, of the first embodiment) is determined in step S802. When an available carrier satisfying the condition is found (YES in step S802), then which communication slots, of the carrier are available is checked in step S803. Thereafter, instruction to change the communication carriers, a designation of the change over carrier, and the available communication slot numbers in the change over carrier are notified to the terminal (PS) 101 via the second communication slot in which no error has occurred in step S804.

After a response from the terminal (PS) 101 is received in step S805, carriers are changed in step S806. At the same time, a status indicating that it is impossible to change carriers is cleared in step S807.

When there is no carrier having at least the same number of available communication slots as that of the communication slots in use in the communication (two communication slots in the first embodiment) (NO in step S802), the status indicating that it is impossible to change carriers is set in step S808, then communication slot switching operation (S809) is performed. The communication slot switching operation, step S809, is explained in detail in FIG. 9.

Referring to FIG. 9, after the communication slot switching operation starts, whether or not the first and third communication slots of the carrier which is currently used in the communication are available is checked in step S901.

If it is determined in step S901 that the first and third communication slots are available, then instruction for changing to the first and third communication slots is transmitted to the terminal (PS) 101 via the second communication slot in which no error has occurred, in step S903.

Then, after a response from the terminal (PS) 101 is received in step S904, the communication slots are changed within the same communication carrier in step S905, and the communication is continued.

If the first and third communication slots are not available, then the communication via the fourth communication slot in which an error is detected is terminated, and instruction for continuing the communication via only the second communication slot in which no error is detected is sent to the terminal (PS) 101 via the second communication slot in step S907.

After a response from the terminal (PS) 101 is received in step S908, a decrease in communication speed is notified to the application software, the communication via the fourth communication slot in which errors have been detected is terminated, and the communication is continued via the second communication terminal in which no error has been detected in step S909.

Further, in the terminal (PS) 101, when instruction for changing carriers is received during communicating with the base station (CS) 102 via the second and fourth communication slots, as shown in FIG. 10 (YES in step S1001), it outputs a response signal to the base station (CS) 102 in step S1005. Then, in step S1006, the terminal (PS) 101 changes to communication slots of a carrier designated by the instruction to change carriers received in step S1001.

Further, when the terminal (PS) 101 receives instruction to change communication slots in step S1003, it outputs a response signal to the base station (CS) 102 in step S1009, and, in step S1010, changes to the communication slots designated by the instruction to change communication slots received in step S1003.

Further, when instruction to terminate the communication via the communication slot in which an error is detected and continue the communication only via the communication slot in which no error has been detected is received in step S1004, the terminal (PS) 101 outputs a response to the base station (CS) 102 in step S1011, and the communication via the communication slot through which the instruction has been received is continued, whereas the communication via the other communication slot is terminated in step S1012.

Note, a case where trouble occurred in one of two communication slots is explained in the above first embodiment. If troubles occur in both of the communication slots, then the communication should be terminated.

By controlling the communication carriers and communication slots as described above, when trouble occurs in one of two communication slots which are in use in communication, it is possible to continue the communication by changing the communication carriers.

Further, if there is no communication carrier having two available communication slots, it is possible to continue communication through the communication slot in which no trouble occurred.

Furthermore, since wireless communication is performed via two communication slots, communications traffic in the time division multiple access communication increases.

Further, a decrease in the communications traffic is prevented when quality of radio channel deteriorates. In addition, when no change over carrier is found, the current wireless link is maintained and a drop of the communications traffic due to a decrease in the number of the radio channels is informed to the application, thereby information for executing the application suitable for the current status of the channel is provided.

<Second Embodiment>

A system configuration, and configurations of a radio base station (CS) 101 and a radio communication terminal (PS) 102 in the second embodiment are the same as those described in the first embodiment; accordingly, explanation of those is omitted.

In the first embodiment, when trouble occurs in a communication slot, a communication carrier which can be changed to is searched for, and, if there is no available communication carrier, communication slots which are in use in communication are changed to other communication slots within the same carrier. In the second embodiment, available slots of the same carrier are searched first, then, if there are not available slots, then the carrier is changed to another carrier.

Further, in the first embodiment, the terminal (PS) 101 communicates via a pair of two communication slots (the first and third communication slots, or the second and fourth communication slots) one of which is a guard slot. In the second embodiment, neither of the two communication slots is used as a guard slot, and any two of the four communication slots (first to fourth communication slots) are used for communication.

Figure 12:
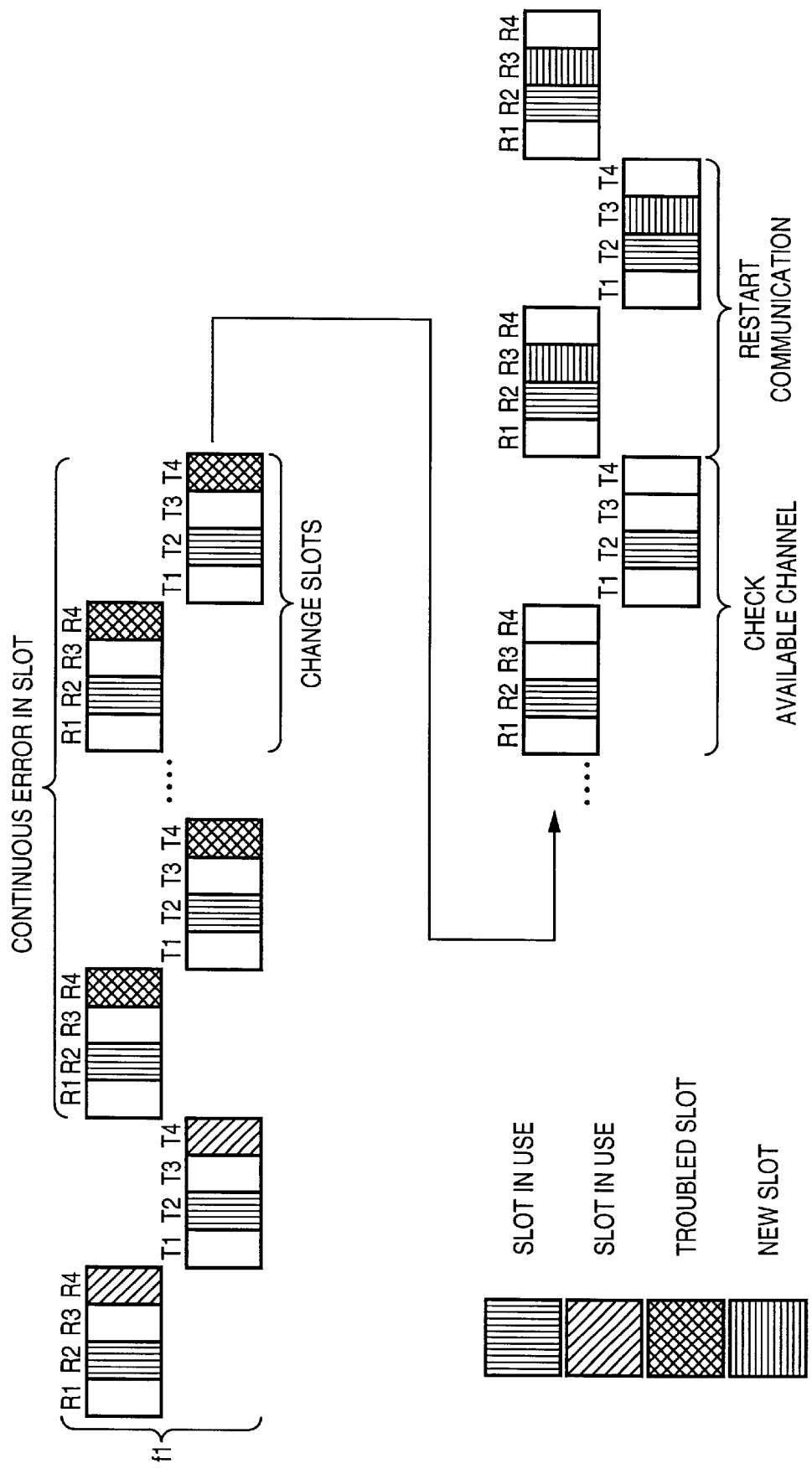
FIG. 12 is a conceptual view showing switching of communication slots according to a second embodiment of the present invention.

FIG. 12 is a conceptual view showing switching of communication slots according to the second embodiment.

Referring to FIG. 12, when communication is performed using the two communication slots (second and fourth communication slots in FIG. 12) in a communication carrier f1, it is assumed that trouble occurred in one of the two communication slots and errors are repeatedly detected more than a predetermined number of times (in the fourth communication slot in FIG. 12). In this case, while keeping the communication via the communication slot in which no error has been occurred (the second communication slot in FIG. 12), the communication slot in which the trouble occurred is changed to another communication slot (the third communication slot in FIG. 12) in the same carrier. Thus, the communication is continued using two communication slots, namely the second communication slot and the newly changed third communication slot.

Figure 13:
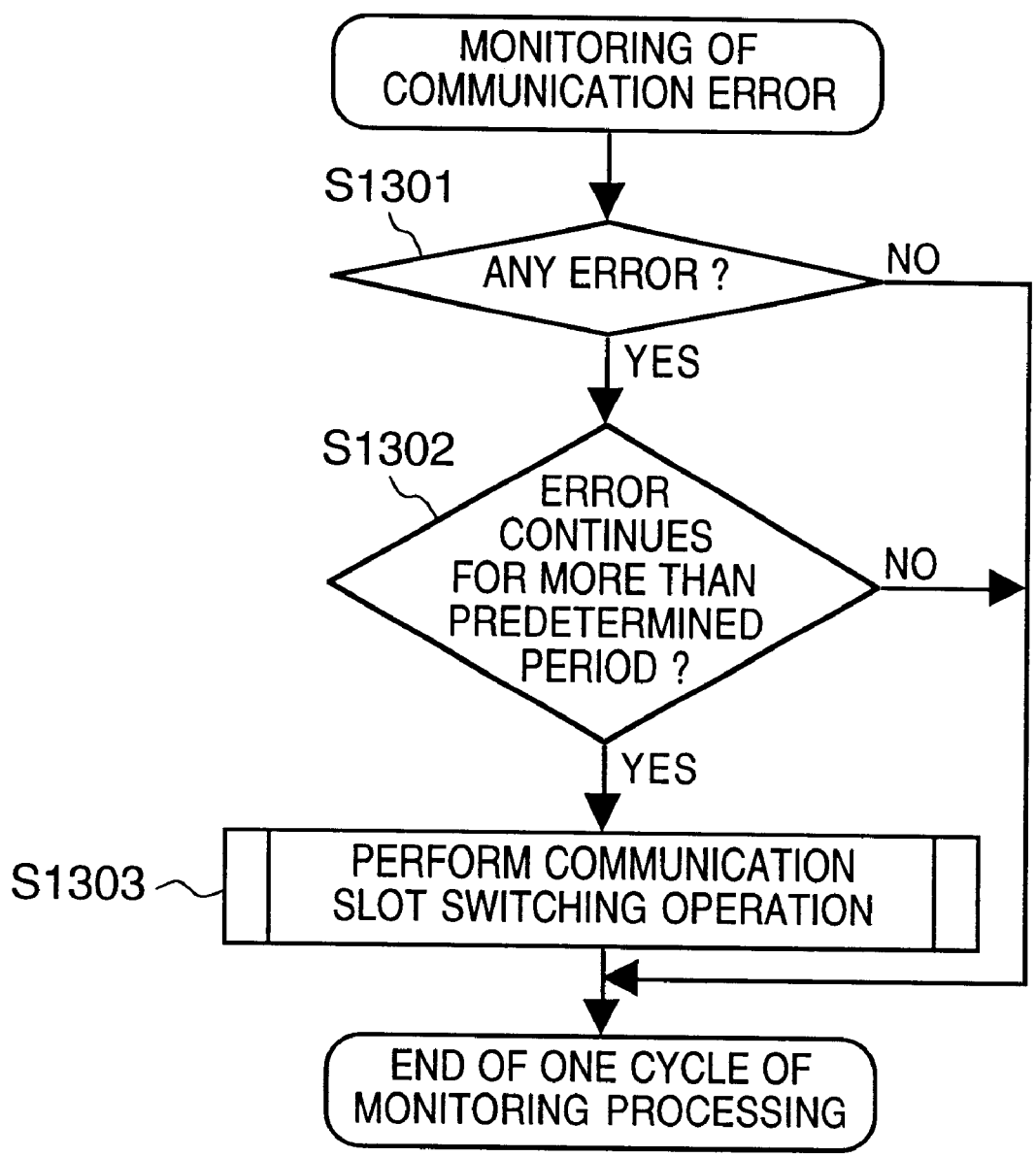
FIG. 13 is a flowchart'showing an operation sequence of a radio controller of a radio base station (CS) according to the second embodiment of the present invention.
Figure 14:
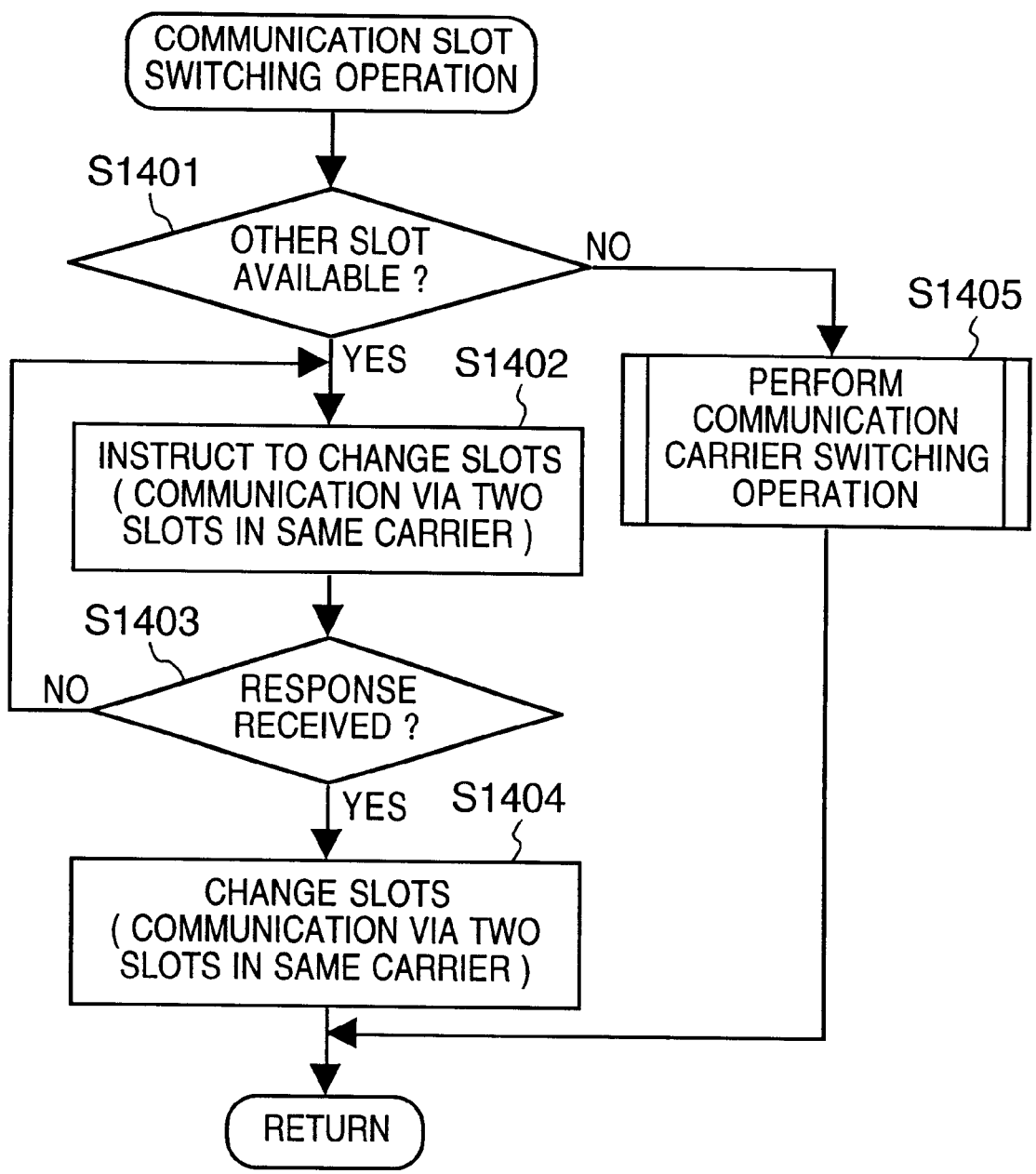
FIG. 14 is a flowchart showing an operation sequence of the radio controller of the base station (CS) according to the second embodiment of the present invention.
Figure 15:
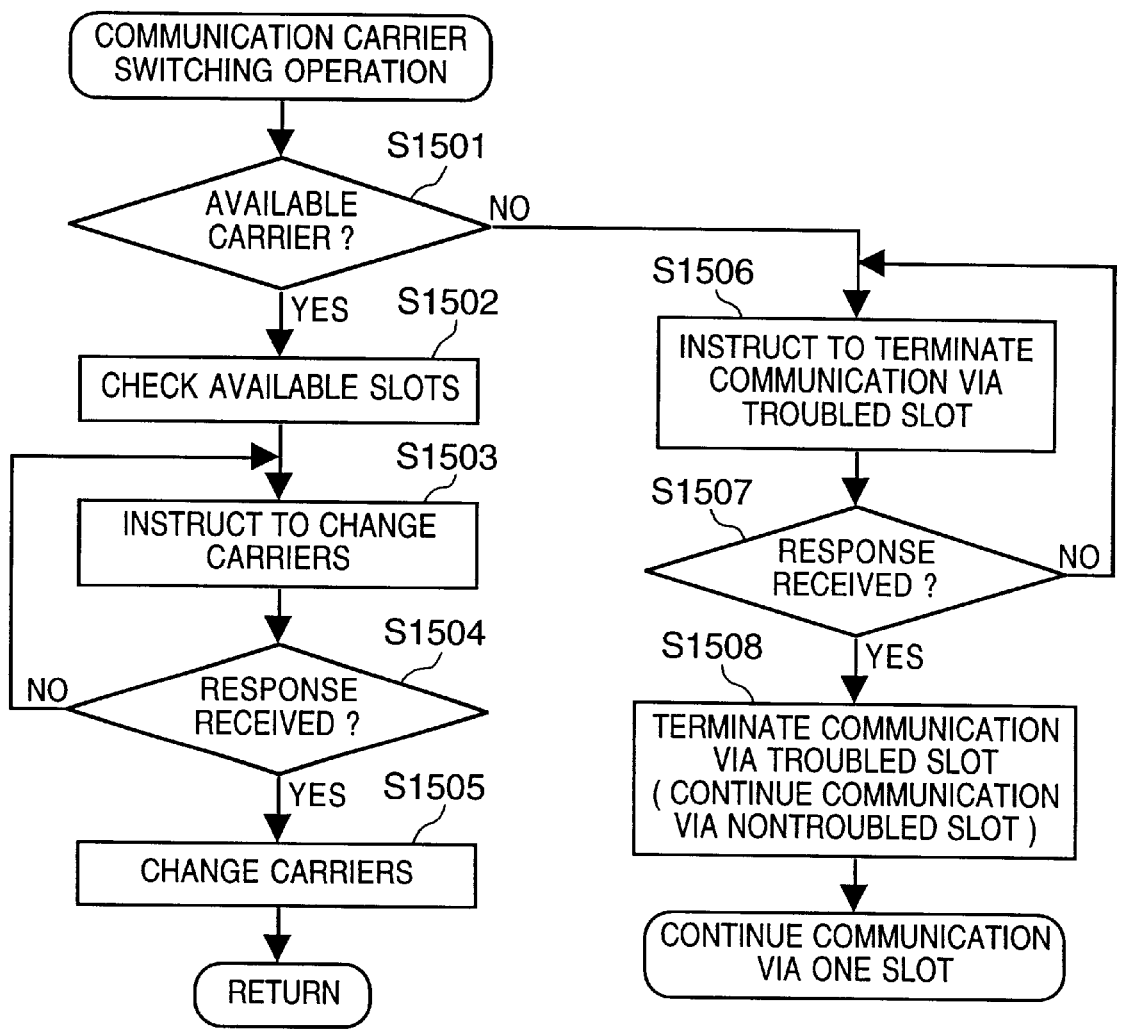
FIG. 15 is a flowchart showing an operation sequence of the radio controller of the base station (CS) according to the second embodiment of the present invention.
Figure 16:
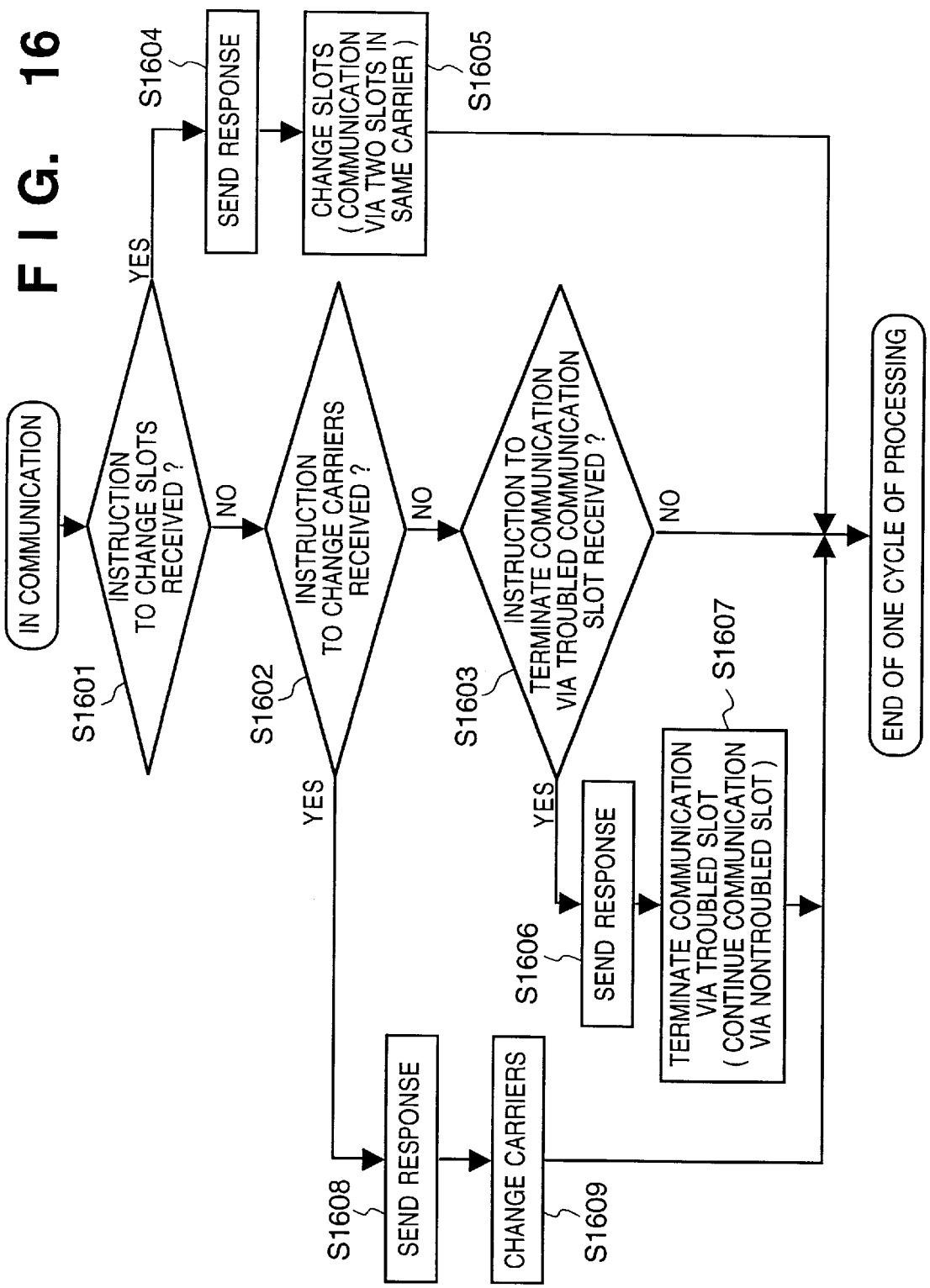
FIG. 16 is a flowchart showing an operation sequence of a controller of a radio communication terminal (PS) according to the second embodiment of the present invention.

FIGS. 13 to 15 are flowcharts showing operations of a radio controller 504 of the base station (CS) 102 for realizing the function of the second embodiment, and FIG. 16 is a flowchart showing operations of a controller 403 of the terminal (PS) 101 according to the second embodiment.

Note, in the second embodiment, communication is performed initially using the second and fourth communication slot.

Referring to FIG. 13, in a case where no error occurs in the communication slots which are in use in the communication (NO in step S1301) or in a case where an error is detected (YES in step S1301) but the error does not continue for more than a predetermined period (No in step S1302), then one cycle of monitoring processing is completed.

Whereas, in a case where an error in a communication slot is detected (YES in step S1301) (assumed that an error occurred in the fourth communication slot in the second embodiment) and the error continues for more than a predetermined period (YES in step S1302), then a communication slot switching operation is performed in step S1303 (details are in FIG. 14), and one cycle of monitoring processing is completed.

In the communication slot switching operation, communication slots are changed to other communication slots of the same carrier in use to continue the communication.

Referring to FIG. 14, after the communication slot switching operation starts, whether or not another communication slot (the first or third communication slot in the second embodiment), other than the communication slots in use (the second and fourth communication slots) in the carrier which is currently used in the communication, is available is checked in step S1401.

If it is determined in step S1401 that the first or third communication slot is available (it is assumed that the third communication slot is available in the second embodiment), then instruction for changing the fourth communication slot to the third communication slot is transmitted to the terminal (PS) 101 via the second communication slot in which no error has occurred, in step S1402.

Then, after a response from the terminal (PS) 101 is received in step S1403, the communication slot is changed within the same communication carrier in step S1404, and the communication is continued.

Further, if neither the first nor third. communication slot is available (NO in step S1401), then communication carrier switching processing is performed in step S1405.

The communication carrier switching operation shown in FIG. 15 is to cope with a case where communication can be continued via at least one of a plurality of communication slots, currently secured for the communication, in a single carrier, but trouble occurs in one or more of the communication slots, which makes the slots useless in the communication, followed by a decrease in the communications traffic and a drop of performance of the communication application, since the number of available slots is decreased.

After the communication carrier switching operation (FIG. 15) starts, first, a carrier having at least the same number of available communication slots as that of communication slots which are currently used in communication (two communication slots in the second embodiment) is searched for using an RF unit (502) which is not currently used in the communication, and whether or not there is an available carrier satisfying the above condition (i.e., having two available communication slots, in the second embodiment) is determined in step S1501. When an available carrier satisfying the condition is found (YES in step S1501), then which of the communication slots of the carrier are available is checked in step S1502. Thereafter, instruction to change the communication carriers, a designation of the change over carrier, and the available communication slot numbers in the change over carrier are notified to the terminal (PS) 101 via the second communication slot in which no error has occurred in step S1503.

After a response from the terminal (PS) 101 is received in step S1504, carriers are changed in step S1505 and the communication is continued.

When no carrier having at least the same number of available communication slots as that of the communication slots in use in the communication (two communication slots in the second embodiment) is found in step S1501, then the communication via the fourth communication slot in which errors have been detected is terminated, and instruction for continuing the communication via only the second communication slot in which no error has been detected is sent to the terminal (PS) 101 via the second communication slot in step S1506.

After a response from the terminal (PS) 101 is received in step S1507, a decrease in communication speed is notified to the application software, the communication via the fourth communication slot in which errors have been detected is terminated, and the communication is continued via the second communication terminal in which no error has been detected in step S1508.

Further, in the terminal (PS) 101, when instruction for changing communication slots is received during communicating with the base station (CS) 102 via the second and fourth communication slots, as shown in FIG. 16 (YES in step S1601), then it outputs a response signal to the base station (CS) 102 in step S1604. Then, in step S1605, the terminal (PS) 101 changes to communication slots, of the same carrier, designated by the instruction to change communication slots received in step S1601.

Further, when the terminal (PS) 101 receives instruction to change communication carriers in step S1602, it outputs a response signal to the base station (CS) 102 in step S1608, and, in step S1609, changes to communication slots of a carrier designated by the instruction to change communication carriers received in step S1602.

Further, when instruction to terminate the communication via the communication slot in which errors have been detected and continue the communication only via the communication slot in which no error has been detected is received in step S1603, the terminal (PS) 101 outputs a response to the base station (CS) 102 in step S1606, and the communication via the communication slot through which the instruction is received is continued, whereas the communication via the other communication slot is terminated in step S1607.

Note, a case where trouble occurred in one of two communication slots is explained in the above second embodiment. If troubles occur in both of the communication slots, then the communication should be terminated.

According to the second embodiment as described above, when trouble occurs in one of two communication slots which are in use in communication, if there is an available communication slot of the same communication carrier in use, it is possible to continue the communication via two communication slots by using an available communication slot.

Further, even if there is no communication slot of the carrier in use, it is possible to continue communication via two communication slots by changing to another carrier having two available carriers.

Further, when it becomes impossible to continue the communication via two communication slots either in the carrier in use or in another carrier, the communication is still continued using one communication slot.

Furthermore, since wireless communication is performed via two communication slots, communications traffic in the time division multiple access communication increases.

Further, a decrease in the communications traffic is prevented when quality of radio channel deteriorates. In addition, when there is no change over carrier, the current wireless link is maintained and the drop of the communications traffic due to the decrease in the number of the radio channels is informed to the application, thereby information for executing the application suitable for the current status of the channel is provided.

<Third Embodiment>

A system configuration, and configurations of a radio base station (CS) 101 and a radio communication terminal (PS) 102 in the third embodiment are the same as those described in the first embodiment; accordingly, explanation of those is omitted.

In the third embodiment, if trouble occurs in one of two communication slots when communication is performed via the two communication slots, the communication is performed using two communication carriers.

Figure 17:
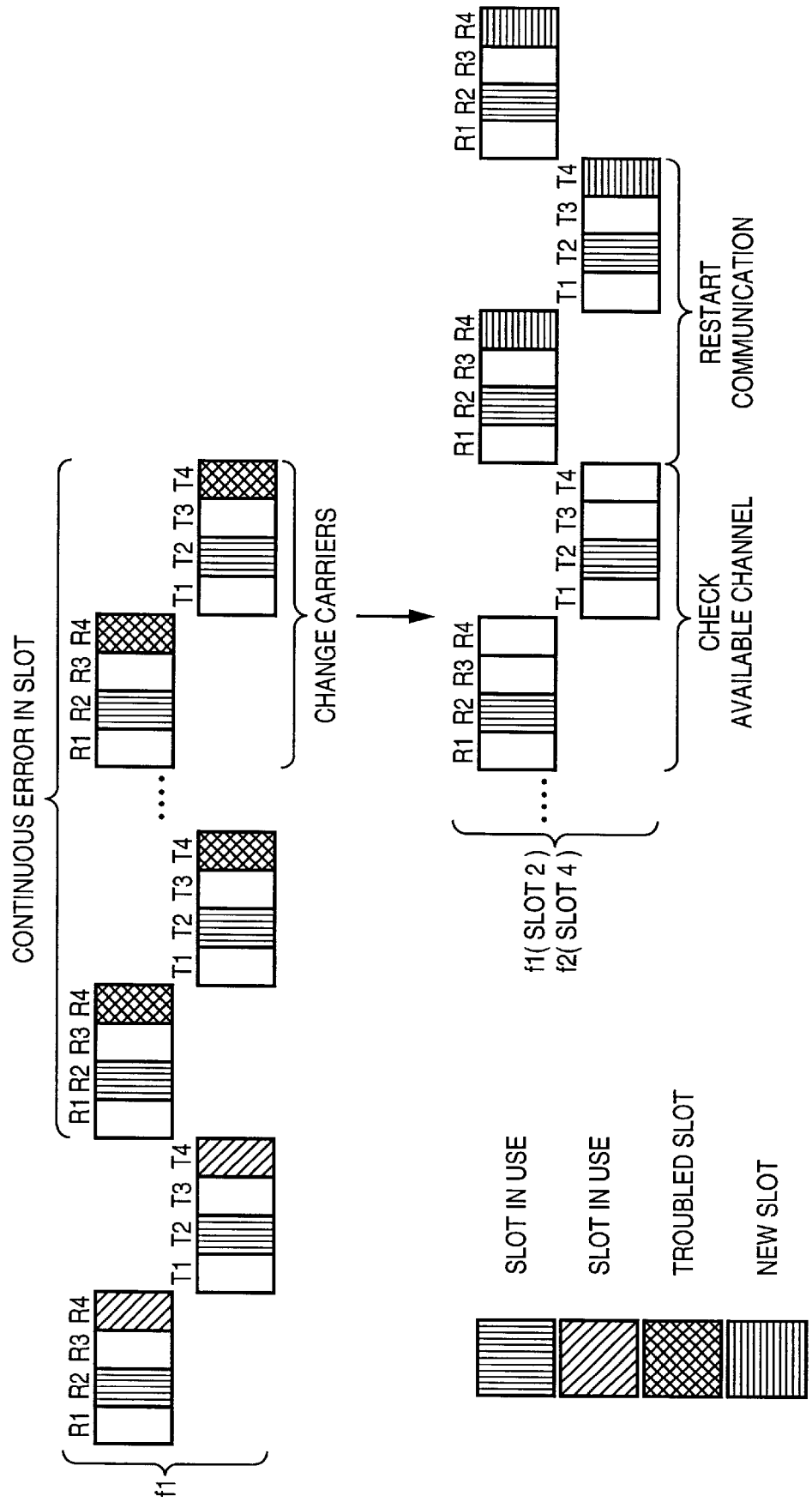
FIG. 17 is a conceptual view showing switching of communication carriers and communication slots according to a third embodiment of the present invention.

FIG. 17 is a conceptual view showing switching of communication carriers and communication slots according to the third embodiment.

Referring to FIG. 17, when communication is performed using the two communication slots (second and fourth communication slots in FIG. 17) in a communication carrier f1, it is assumed that trouble occurred in one of the two communication slots and errors are repeatedly detected more than a predetermined number of times (in the fourth communication slot in FIG. 17). In this case, while keeping the communication via the communication slot in which no error occurred (the second communication slot in FIG. 17), the communication slot in which the trouble occurred is changed to a communication slot of another carrier f2. Thus, the communication is continued using two communication slots, namely the second communication slot and the newly changed fourth communication slot of the carrier f2.

Figure 18:
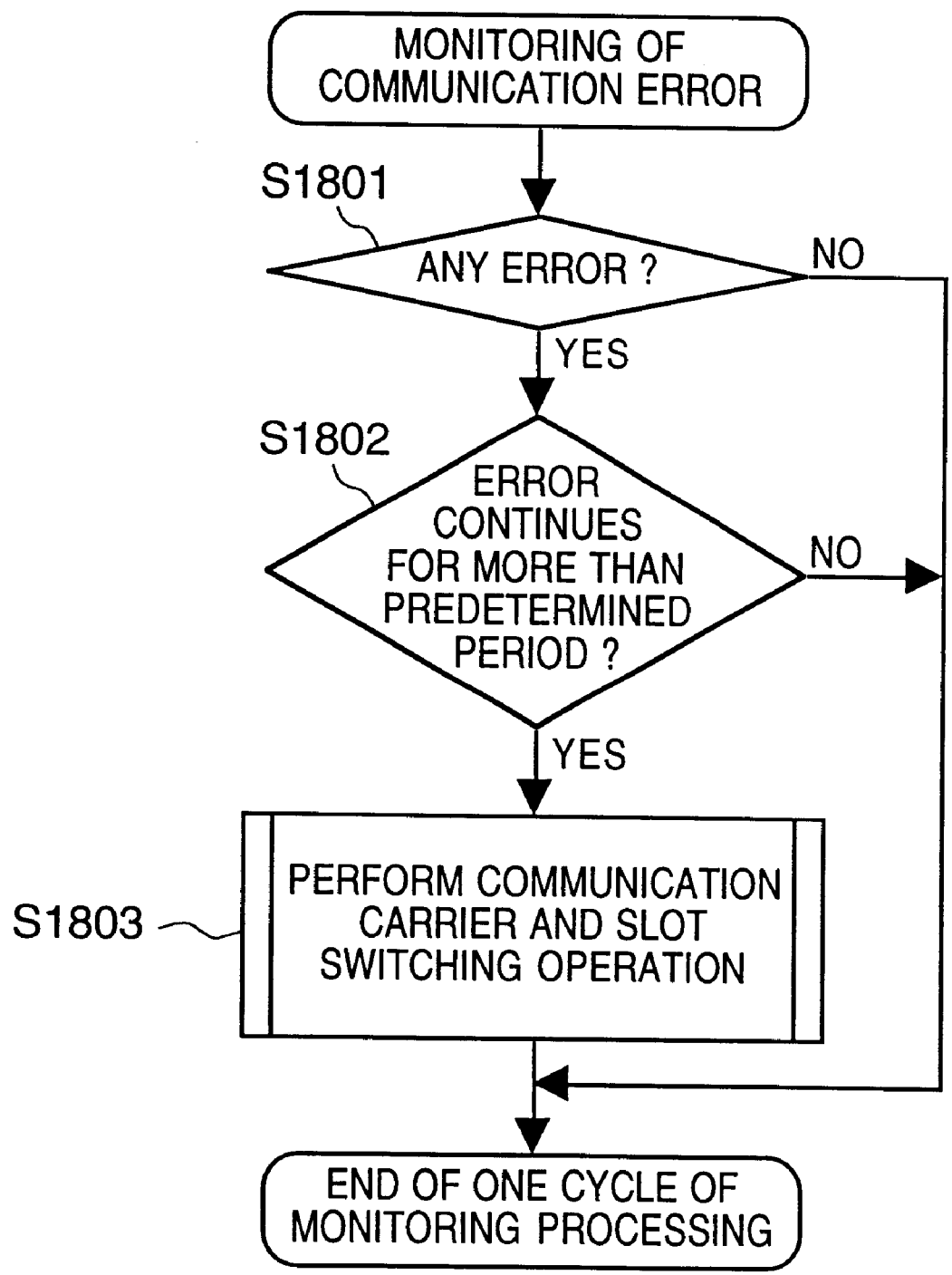
FIG. 18 is a flowchart showing switching processing of communication carriers and communication slots of a radio controller of a radio base station (CS) according to the third embodiment of the present invention.
Figure 19:
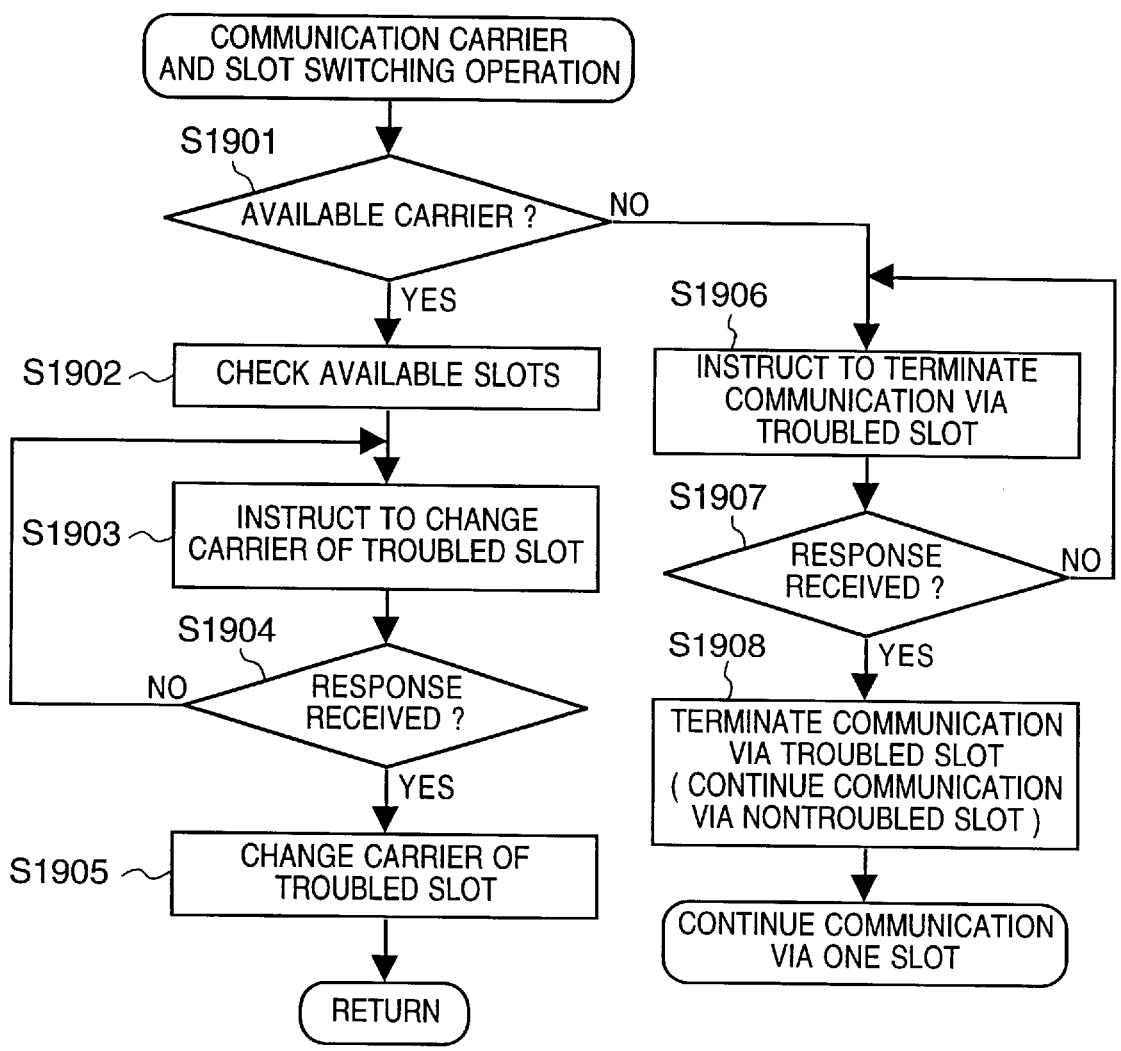
FIG. 19 is a flowchart showing switching processing of communication carriers and communication slots by the radio controller of the radio base station (CS) according to the third embodiment of the present invention.

Flowcharts showing switching operations of communication carriers and communication slots, according to the third embodiment, performed by a radio controller 504 of the base station (CS) 102 are shown in FIGS. 18 and 19, and a flowchart showing switching operation of communication slots, according to the third embodiment, performed by a controller 403 of the terminal (PS) 101 is shown in FIG. 20.

Note, in the third embodiment, communication is performed initially using the second and fourth communication slots of the communication carrier f1, and trouble occurs in the fourth communication slot. Accordingly, while continuing the communication via the second communication slot of the carrier f1, the communication via the fourth communication slot of the carrier f1 is changed to the carrier f2. Thus, the communication is continued using two communication slots, namely the second communication slot of the carrier f1 and the fourth communication slot of the carrier f2.

Referring to FIG. 18, while communication between the terminal (PS) 101 and the base station (CS) 102 is carried out via two communication slots (second and fourth communication slots in the third embodiment) in the carrier f1, in a case where no error occurs in the communication slots which are in use in the communication (NO in step S1801) or in a case where an error is detected (YES in step S1801) but the error does not continue for more than a predetermined period (NO in step S1802), then one cycle of monitoring processing is completed.

Whereas, in a case where an error in a communication slot is detected (YES in step S1801) (assumed that the error occurred in the fourth communication slot in the third embodiment) and the error continues for more than a predetermined period (YES in step S1802), then a communication carrier and slot switching operation is performed in step S1803 (details are in FIG. 19), and one cycle of monitoring processing is completed.

The communication carrier and slot switching operation shown in FIG. 19 is to cope with a case where communication can be continued via at least one of a plurality of communication slots, currently secured for the communication, in a single carrier, but trouble occurs in one or more of the communication slots, which makes the slots useless in the communication, followed by a decrease in the communications traffic and a drop of performance of the communication application, since the number of available slots is decreased.

After the communication carrier and slot switching operation (FIG. 19) starts, first, a carrier having at least the same number of available communication slot or slots as that of communication slot or slots in which trouble occurred (one communication slots, e.g., the fourth communication slot, in the third embodiment) is searched using an RF unit (502) which is not currently used in the communication. Whether or not there is an available carrier satisfying the above condition (i.e., having one available communication slot, in the third embodiment) is determined in step S1901. When an available carrier satisfying the condition (the communication carrier f2 in the third embodiment) is found (YES in step S1901), then which communication slots in the carrier is/are available is checked in step S1902. Thereafter, instruction to change the communication carrier of the fourth communication slots in which errors have been detected to the carrier f2, and the available communication slot number or numbers (the fourth communication slot in the third embodiment) in the carrier f2 to be changed to are notified to the terminal (PS) 101 via the second communication slot in which no error has occurred in step S1903.

After a response from the terminal (PS) 101 is received in step S1904, the carrier of the fourth communication slot is changed from f1 to f2 in step S1905 and the communication is continued.

When no carrier having at least the same number of available communication slot or slots as that of the communication slot or slots in which trouble occurred (one communication slot, e.g., the fourth communication slot, in the third embodiment) is found in step S1901, then the communication via the fourth communication slot in which errors have been detected is terminated, and instruction for continuing the communication via only the second communication slot in which no error has been detected is sent to the terminal (PS) 101 via the second communication slot in step S1906.

After a response from the terminal (PS) 101 is received in step S1907, a decrease in communication speed is notified to the application software, the communication via the fourth communication slot in which errors have been detected is terminated, and the communication is continued via the second communication terminal in which no error has been detected in step S1908.

Further, the terminal (PS) 101, when instruction for changing communication carriers and slots is received during communicating with the base station (CS) 102 via the second and fourth communication slots of the carrier f1, as shown in FIG. 20 (YES in step S2001), it outputs a response signal to the base station (CS) 102 in step S2002. Then, in step S2003, the terminal (PS) 101 changes the fourth communication slot of the carrier f1 to the fourth communication slot of the carrier f2 designated by the instruction to change communication carriers and slots received in step S2001.

Further, when instruction to terminate the communication via the communication slot in which errors have been detected and continue the communication only via the communication slot in which no error has been detected is received in step 52004, the terminal (PS) 101 outputs a response to the base station (CS) 102 in step S2005, and the communication via the communication slot through which the instruction is received is continued, whereas the communication via the other communication slot is terminated in step S2006.

Note, a case where trouble occurred in one of two communication slots is explained in the above second embodiment. If troubles occur in both of the communication slots, then the communication should be terminated.

According to the third embodiment as described above, when trouble occurs in one of the two communication slots which are in use in communication, the communication in the troubled communication slot is continued via a communication slot of another carrier; therefore, it is possible to continue the communication via two communication slots even when trouble occurs in a communication slot used in the communication.

Further, when it is impossible to change a communication slot in which trouble occurred to a communication slot of another carrier, the communication is still continued using one communication slot.

Furthermore, since wireless communication is continued via two communication slots, communications traffic in the time division multiple access communication increases.

Further, a decrease in the communications traffic is prevented when quality of radio channel deteriorates. In addition, when no available carrier is found, the current wireless link is maintained and a drop of the communications traffic due to a decrease in the number of the radio slots is informed to the application, thereby information for executing the application suitable for the current status of the channel is provided.

Note, in the first and second embodiments, when two available communication slots are in one carrier, communication carrier or communication slots are changed. However, when there is no carrier having two available communication slots, communication is continued using two carriers as described in the third embodiment.

According to the first to third embodiments as described above, communication via two communication slots has a high probability of continuing.

Further, in the first to third embodiments, as an example of a wireless communication system, realizing multiple access-duplex communication using a plurality of communication slots assigned to a plurality of communication carriers, a wireless data communication system whose wireless communication medium is PHS is explained. However, the present invention is not limited to this, and is also applicable to other wireless communication systems, such as personal digital cellular (PDC), personal communication service (PCS), digital European cordless telephone (DECT), and a wireless LAN adapting frequency hopping, capable of performing the multiple access-duplex communication using a plurality of communication slots assigned to a plurality of communication carriers.

Furthermore, the present invention is applicable to any apparatuses and systems which perform time-division wireless communication.

Further, according to the first to third embodiments as described above, radio communication simultaneously using two communication slots is explained; however, the present invention is also applicable to radio communication via more than two communication slots.

Further, in the first to third embodiments, a radio base station issues instruction to change communication carriers and/or slots to a radio communication terminal. However, the terminal may issue the instruction to the base station.

Further, in the first to third embodiments, a communication apparatus which multiplexes four communication slots in time division in one communication carrier is explained. However, the present invention is applicable to a communication apparatus which multiplexes more than four communication slots of one communication carrier.

According to the present invention as described above, it is possible to keep the same or similar communications traffic when a radio channel of a communication slot is deteriorated.

When a drop of the communications traffic can not be avoid, a current wireless link is maintained, and information for executing an application suitable for the status of a channel is provided by informing the application of a drop of communications traffic due to a decrease in the number of available communication slots.

The present invention is not limited to the above embodiments and various changes and modifications can be made within the spirit and scope of the present invention. Therefore to apprise the public of the scope of the present invention, the following claims are made.

What is claimed is:

1. A wireless communication system including a first wireless communication apparatus and a second wireless communication apparatus, which perform time-division wireless communication, said system comprising:

assigning means for assigning a series of data to a plurality of communication slots in a first communication carrier;

communication means for communicating via the plurality of communication slots, assigned by said assigning means, in the first communication carrier;

determination means for determining that a communication slot out of the plurality of communication slots is unusable when communication is being performed using the plurality of communication slots by said communication means; and changing means for, when said determination means determines that a communication slot out of the plurality of communication slots is unusable, changing the communication slot which is determined unusable by said determination means, at least, to another communication slot.

2. The wireless communication system according to claim 1, wherein said changing means changes the communication slot which is determined unusable by said determination means to an available communication slot of a second communication carrier.

3. The wireless communication system according to claim 2, wherein said changing means changes the communication slot which is determined unusable by said determination means to an available communication slot of the first communication carrier when no available communication slot is found in the second communication carrier.

4. The wireless communication system according to claim 2, wherein said changing means changes all of the plurality of communication slots in the first carrier to available communication slots in the second communication carrier.

5. The wireless communication system according to claim 2, wherein said changing means changes only the communication slot which is determined unusable by said determination means to an available communication slot of the second communication carrier.

6. The wireless communication system according to claim 1, wherein said changing means changes the communication slot which is determined unusable by said determination means to an available slot of the first communication carrier.

7. The wireless communication system according to claim 6, wherein said changing means changes the communication slot which is determined unusable by said determination means to an available slot of a second communication carrier when no available slot is found in the first communication carrier.

8. The wireless communication system according to claim 1, wherein said changing means terminates communication via the communication slot which is determined unusable by said determination means when no available communication slot is found, and continues communication via the remaining plurality of communication slots.

9. A first wireless communication apparatus, which performs time-division wireless communication with a second wireless communication apparatus, comprising:

assigning means for assigning a series of data to a plurality of communication slots in a first communication carrier;

communication means for communicating via the plurality of communication slots, assigned by said assigning means, in the first communication carrier;

determination means for determining that a communication slot out of the plurality of communication slots is unusable when communication is being performed using the plurality of communication slots by said communication means; and changing means for, when said determination means determines that a communication slot out of the plurality of communication slots is unusable, changing the communication slot which is determined unusable by said determination means, at least, to another communication slot.

10. The first wireless communication apparatus according to claim 9, wherein said changing means changes the communication slot which is determined unusable by said determination means to an available communication slot of a second communication carrier.

11. The first wireless communication apparatus according to claim 10, wherein said changing means changes the communication slot which is determined unusable by said determination means to an available communication slot of the first communication carrier when no available communication slot is found in the second communication carrier.

12. The first wireless communication apparatus according to claim 10, wherein said changing means changes all of the plurality of communication slots in the first carrier to available communication slots in the second communication carrier.

13. The first wireless communication apparatus according to claim 10, wherein said changing means changes only the communication slot which is determined unusable by said determination means to an available communication slot of the second communication carrier.

14. The first wireless communication apparatus according to claim 9, wherein said changing means changes the communication slot which is determined unusable by said determination means to an available slot of the first communication carrier.

15. The first wireless communication apparatus according to claim 14, wherein said changing means changes the communication slot which is determined unusable by said determination means to an available slot of a second communication carrier when no available slot is found in the first communication carrier.

16. The first wireless communication apparatus according to claim 9, wherein said changing means terminates communication via the communication slot which is determined unusable by said determination means when no available communication slot is found, and continues communication via the remaining plurality of communication slots.

17. A communication method for a wireless communication system including a first wireless communication apparatus and a second wireless communication apparatus which perform time-division wireless communication, said method comprising:
    an assigning step of assigning a series of data to a plurality of communication slots in a first communication carrier;
    a communication step of communicating via the plurality of communication slots, assigned in said assigning step, in the first communication carrier;
    a determination step of determining that a communication slot out of the plurality of communication slots is unusable when communication is being performed using the plurality of communication slots by said communication step; and
    a changing step of, when it is determined in said determination step that a communication slot out of the plurality of communication slots is unusable, making the wireless communication system change the communication slot which is determined unusable in said determination step, at least, to another communication slot.

18. The communication method according to claim 17, wherein, in said changing step, the communication slot which is determined unusable in said determination step is changed to an available communication slot of a second communication carrier.

19. The communication method according to claim 18, wherein, in said changing step, the communication slot which is determined unusable in said determination step is changed to an available communication slot of the first communication carrier when no available communication slot is found in the second communication carrier.

20. The communication method according to claim 18, wherein, in said changing step, all of the plurality of communication slots in the first carrier are changed to available communication slots in the second communication carrier.

21. The communication method according to claim 18, wherein, in said changing step, only the communication slot which is determined unusable in said determination step is changed to an available communication slot of the second communication carrier.

22. The communication method according to claim 17, wherein, in said changing step, the communication slot which is determined unusable in said determination step is changed to an available slot of the first communication carrier.

23. The communication method according to claim 22, wherein, in said changing step, the communication slot which is determined unusable in said determination step is changed to an available slot of a second communication carrier when no available slot is found in the first communication carrier.

24. The communication method according to claim 17, wherein, in said changing step, communication via the communication slot which is determined unusable in said determination step is terminated when no available communication slot is found, and communication is continued via the remaining plurality of communication slots.

25. A communication method for a first wireless communication apparatus, which performs time-division wireless communication with a second wireless communication apparatus, said method comprising:
    an assigning step of assigning a series of data to a plurality of communication slots in a first communication carrier;
    a communication step of communicating via the plurality of communication slots, assigned in said assigning step, in the first communication carrier;
    a determination step of determining that a communication slot out of the plurality of communication slots is unusable when communication is being performed using the plurality of communication slots by said communication step; and
    a changing step of, when it is determined in said determination step that a communication slot out of the plurality of communication slots is unusable, making the wireless communication system change the communication slot which is determined unusable in said determination step, at least, to another communication slot.

26. The communication method according to claim 25, wherein, in said changing step, the communication slot which is determined unusable in said determination step is changed to an available communication slot of a second communication carrier.

27. The communication method according to claim 26, wherein, in said changing step, the communication slot which is determined unusable in said determination step is changed to an available communication slot of the first communication carrier when no available communication slot is found in the second communication carrier.

28. The communication method according to claim 26, wherein, in said changing step, all of the plurality of communication slots in the first carrier are changed to available communication slots in the second communication carrier.

29. The communication method according to claim 26, wherein, in said changing step, only the communication slot which is determined unusable in said determination step is changed to an available communication slot of the second communication carrier.

30. The communication method according to claim 25, wherein, in said changing step, the communication slot which is determined unusable in said determination step is changed to an available slot of the first communication carrier.

31. The communication method according to claim 30, wherein, in said changing step, the communication slot which is determined unusable in said determination step is changed to an available slot of a second communication carrier when no available slot is found in the first communication carrier.

32. The communication method according to claim 25, wherein, in said changing step, communication via the communication slot which is determined unusable in said determination step is terminated when no available communication slot is found, and communication is continued via the remaining plurality of communication slots.

33. A first wireless communication apparatus, which performs time-division wireless communication with a second wireless communication apparatus, comprising:

assigning means for assigning a series of data to a plurality of communication slots in a first communication carrier;

communication means for communicating via the plurality of communication slots, assigned by said assigning means, in the first communication carrier;

reception means for receiving an instruction signal, from the second wireless communication apparatus, indicative of changing a communication slot out of the plurality of communication slots when communication is being performed using the plurality of communication slots by said communication means; and changing means for changing the communication slot which is instructed to be changed, at least, to another communication slot on the basis of the instruction signal received by said reception means.

34. The first wireless communication apparatus according to claim 33, wherein said changing means changes the communication slot which is indicated by the instruction signal to an available communication slot of a second communication carrier.

35. The first wireless communication apparatus according to claim 34, wherein said changing means changes the communication slot which is indicated by the instruction signal to an available communication slot of the first communication carrier when no available communication slot is found in the second communication carrier.

36. The first wireless communication apparatus according to claim 34, wherein said changing means changes all of the plurality of communication slots in the first carrier to available communication slots in the second communication carrier.

37. The first wireless communication apparatus according to claim 34, wherein said changing means changes only the communication slot which is indicated by the instruction signal to an available communication slot of the second communication carrier.

38. The first wireless communication apparatus according to claim 33, wherein said changing means changes the communication slot which is indicated by the instruction signal to an available slot of the first communication carrier.

39. The first wireless communication apparatus according to claim 38, wherein said changing means changes the communication slot which is indicated by the instruction signal to an available slot of a second communication carrier when no available slot is found in the first communication carrier.

40. The first wireless communication apparatus according to claim 33, wherein said changing means terminates communication via the communication slot which is indicated by the instruction signal when no available communication slot is found, and continues communication via the remaining plurality of communication slots.

41. A communication method for a first wireless communication apparatus, which performs time-division wireless communication with a second wireless communication apparatus, said method comprising:

an assigning step of assigning a series of data to a plurality of communication slots in a first communication carrier;

a communication step of making the wireless communication system communicate via the plurality of communication slots, assigned in said assigning step, in the first communication carrier;

a reception step of receiving an instruction signal, from the second wireless communication apparatus, indicative of changing a communication slot out of the plurality of communication slots when communication is being performed using the plurality of communication slots by said communication step; and a changing step of changing the communication slot which is instructed to be changed, at least, to another communication slot on the basis of the instruction signal received in said reception step.

42. The communication method according to claim 41, wherein, in said changing step, the communication slot which is instructed by the instruction signal is changed to an available communication slot of a second communication carrier.

43. The communication method according to claim 42, wherein, in said changing step, the communication slot which is instructed by the instruction signal is changed to an available communication slot of the first communication carrier when no available communication slot is found in the second communication carrier.

44. The communication method according to claim 42, wherein, in said changing step, all of the plurality of communication slots in the first carrier are changed to available communication slots in the second communication carrier.

45. The communication method according to claim 42, wherein, in said changing step, only the communication slot which is instructed by the instruction signal is changed to an available communication slot of the second communication carrier.

46. The communication method according to claim 41, wherein, in said changing step, the communication slot which is instructed by the instruction signal is changed to an available slot of the first communication carrier.

47. The communication method according to claim 46, wherein, in said changing step, the communication slot which is instructed by the instruction signal is changed to an available slot of a second communication carrier when no available slot is found in the first communication carrier.

48. The communication method according to claim 41, wherein, in said changing step, communication via the communication slot which is instructed by the instruction signal is terminated when no available communication slot is found, and communication is continued via the remaining plurality of communication slots.

* * * * *

UNITED STATES PATENT AND TRADEMARK OFFICE
CERTIFICATE OF CORRECTION

PATENT NO.    : 6,333,916 B1                                    Page 1 of 1
DATED         : December 25, 2001
INVENTOR(S)   : Hamada et al.

It is certified that error appears in the above-identified patent and that said Letters Patent is hereby corrected as shown below:

<u>Title page,</u>
Item [56], U.S. PATENT DOCUMENTS, delete "8,570,391 * 2/1999 Nago.......370/330" and insert therefor -- 5,870,391 * Nago....370/330 --

<u>Column 1,</u>
Line 62, delete "avoid." and insert therefor -- avoided. --

<u>Column 2,</u>
Line 44, delete "flowchart'" and insert therefor -- flowchart --

<u>Column 4,</u>
Line 24, delete "thee" and insert -- therefor -- the --

<u>Column 5,</u>
Line 63, delete "second fourth" and insert therefor -- second and fourth --

<u>Column 8,</u>
Line 21, delete "been occurred" and insert therefor -- occurred --

<u>Column 9,</u>
Line 3, delete "third." and insert therefor -- third --

<u>Column 12,</u>
Line 33, delete "52004" and insert therefor -- S2004 --

<u>Column 13,</u>
Line 45, delete "avoid," and insert therefor -- avoided, --

Signed and Sealed this

Twenty-fifth Day of June, 2002

*Attest:*

JAMES E. ROGAN
*Attesting Officer*   *Director of the United States Patent and Trademark Office*